United States Patent
Yoshida et al.

(10) Patent No.: US 9,379,983 B2
(45) Date of Patent: Jun. 28, 2016

(54) ROUTER, METHOD FOR CONTROLLING ROUTER, AND COMPUTER PROGRAM

(71) Applicant: Panasonic Corporation, Osaka (JP)

(72) Inventors: Atsushi Yoshida, Osaka (JP); Satoru Tokutsu, Saitama (JP); Tomoki Ishii, Kyoto (JP); Takao Yamaguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 248 days.

(21) Appl. No.: 14/156,912

(22) Filed: Jan. 16, 2014

(65) Prior Publication Data

US 2014/0133307 A1     May 15, 2014

Related U.S. Application Data

(63) Continuation of application No. PCT/JP2012/007286, filed on Nov. 13, 2012.

(30) Foreign Application Priority Data

Nov. 17, 2011  (JP) ................. 2011-251353

(51) Int. Cl.
*H04L 12/803* (2013.01)
*H04L 12/403* (2006.01)
(Continued)

(52) U.S. Cl.
CPC ............ *H04L 47/125* (2013.01); *H04L 12/403* (2013.01); *H04L 12/40013* (2013.01); *H04L 12/6418* (2013.01); *H04L 49/90* (2013.01)

(58) Field of Classification Search
CPC ............ H04L 47/125; H04L 12/40013; H04L 12/40019; H04L 12/40026; H04L 12/40189; H04L 49/90
See application file for complete search history.

(56) References Cited

U.S. PATENT DOCUMENTS 7,215,637 B1 * 5/2007 Ferguson ............... H04L 45/00 370/230.1
8,036,226 B1 * 10/2011 Ma ........................ H04L 45/00 370/235

(Continued)

FOREIGN PATENT DOCUMENTS

JP   2004-056328 A   2/2004
WO  WO 2011/108174 A1  9/2011

OTHER PUBLICATIONS

International Search Report for corresponding International Application No. PCT/JP2012/007286 mailed Dec. 25, 2012.
(Continued)

*Primary Examiner* — Paul H Masur
*Assistant Examiner* — Kabir Jahangir
(74) *Attorney, Agent, or Firm* — Renner, Otto, Boisselle & Sklar, LLP

(57) ABSTRACT

In a bus system including a bus master, a first bus, and a second bus to connect them together, this router is arranged on the second bus to relay packets. The bus master outputs packets including information about at least one of (N+1) predetermined types of quality requirements. The second bus transmits packets designating at most N types of quality requirements. An exemplary router controls sending of the packets, with respect to at most N types of buffers that classify and store the packets by reference to the quality requirement type information and the packets stored in the buffers, so that the packets are sent in the descending order of their level of the quality requirement. The router controls sending schedule of the traffic flows by sensing a difference between the (N+1) different types of quality requirements.

14 Claims, 32 Drawing Sheets

(51) Int. Cl.
    *H04L 12/64*     (2006.01)
    *H04L 12/40*     (2006.01)
    *H04L 12/861*     (2013.01)

(56) References Cited

U.S. PATENT DOCUMENTS

| | | | | |
|---|---|---|---|---|
| 2002/0126680 | A1* | 9/2002 | Inagaki | H04L 12/4625 370/401 |
| 2002/0141403 | A1* | 10/2002 | Akahane | H04L 45/00 370/389 |
| 2006/0203721 | A1* | 9/2006 | Hsieh | H04L 12/4633 370/229 |
| 2007/0223372 | A1* | 9/2007 | Haalen | H04L 45/38 370/229 |
| 2008/0239949 | A1* | 10/2008 | Nishizaki | H04L 12/5601 370/230 |
| 2009/0161684 | A1 | 6/2009 | Voruganti | |
| 2009/0262747 | A1* | 10/2009 | Nakagawa | H04L 12/4641 370/412 |
| 2012/0014265 | A1* | 1/2012 | Schlansker | H04L 43/18 370/252 |
| 2012/0057467 | A1 | 3/2012 | Yoshida et al. | |

OTHER PUBLICATIONS

Vermeulen et al., "Bringing Communication Networks on a Chip: Test and Verification Implications", IEEE Communications Magazine, IEEE Service Center, Piscataway, US, vol. 41, No. 9, Sep. 1, 2003, pp. 74-81, XP001177643.

Extended European Search Report dated Jan. 13, 2016 for corresponding European Application No. 12850174.9.

* cited by examiner

FIG.2

| TYPE | DESCRIPTION | EXEMPLARY APPLICATION |
|---|---|---|
| A. QUALITY ENSURED TYPE | TRAFFIC FLOW THAT ALWAYS NEEDS TO ENSURE PREDETERMINED QUALITY | VOICE CALL, IF OPERATING |
| B. BEST-EFFORT LOW-DELAY TYPE | TRAFFIC FLOW THAT NEEDS TO ENSURE PREDETERMINED QUALITY AND INCREASE TRANSFER RATE ACCORDING TO AVAILABILITY OF BUS TRANSMISSION BAND | VIDEO PLAYBACK |
| C. BEST-EFFORT TYPE | TRAFFIC FLOW THAT JUST NEEDS TO BE TRANSMITTED USING UNUSED BUS TRANSMISSION BAND AND DOES NOT HAVE TO SATISFY ANY QUALITY REQUIREMENT | WEB APPLICATION, FILE TRANSFER |

FIG.8

| CONNECTION PORT | BUS TYPE |
|---|---|
| INPUT PORT 0 | LOCAL BUS |
| INPUT PORT 1 | LOCAL BUS |
| OUTPUT PORT 0 | LOCAL BUS |
| OUTPUT PORT 1 | BACKBONE BUS |

*FIG.11B*

| DESTINATION ADDRESS | OUTPUT PORT |
|---|---|
| 0** | 0 |
| 1** | 1 |

| DESTINATION ADDRESS | OUTPUT PORT |
|---|---|
| 000 | 0 |
| 001 | 0 |
| 010 | 0 |
| 011 | 0 |
| 100 | 1 |
| 101 | 1 |
| 110 | 1 |
| 111 | 1 |

*FIG.14*

|  | FOR LOCAL BUS | FOR BACKBONE BUS |
|---|---|---|
| A1. TIME DELAY GUARANTEED TYPE TRAFFIC | Hi BUFFER | Hi BUFFER |
| A2. THROUGHPUT GUARANTEED TYPE TRAFFIC | Mid BUFFER | Hi BUFFER |
| B. BEST-EFFORT LOW-DELAY TYPE TRAFFIC | Lo BUFFER | Mid BUFFER |
| C. BEST-EFFORT TYPE TRAFFIC | Lo BUFFER | Lo BUFFER |

*FIG.16*

|  | FOR LOCAL BUS | FOR BACKBONE BUS |
|---|---|---|
| A1. TIME DELAY GUARANTEED TYPE TRAFFIC | Hi BUFFER | Hi BUFFER |
| A2. THROUGHPUT GUARANTEED TYPE TRAFFIC | Hi BUFFER | Hi BUFFER |
| B. BEST-EFFORT LOW-DELAY TYPE TRAFFIC | Lo BUFFER | Hi BUFFER |
| C. BEST-EFFORT TYPE TRAFFIC | Lo BUFFER | Lo BUFFER |

FIG.20

ROUTING TABLE FOR BEST-EFFORT TYPE TRAFFIC

| DESTINATION ADDRESS | OUTPUT PORT |
|---|---|
| 000 | 1 |
| 001 | |
| 010 | |
| 011 | |
| 100 | |
| 101 | |
| 110 | |
| 111 | |

ROUTING TABLE FOR BEST-EFFORT LOW-DELAY TYPE TRAFFIC

| DESTINATION ADDRESS | OUTPUT PORT |
|---|---|
| 000 | 0 |
| 001 | |
| 010 | |
| 011 | |
| 100 | |
| 101 | |
| 110 | |
| 111 | |

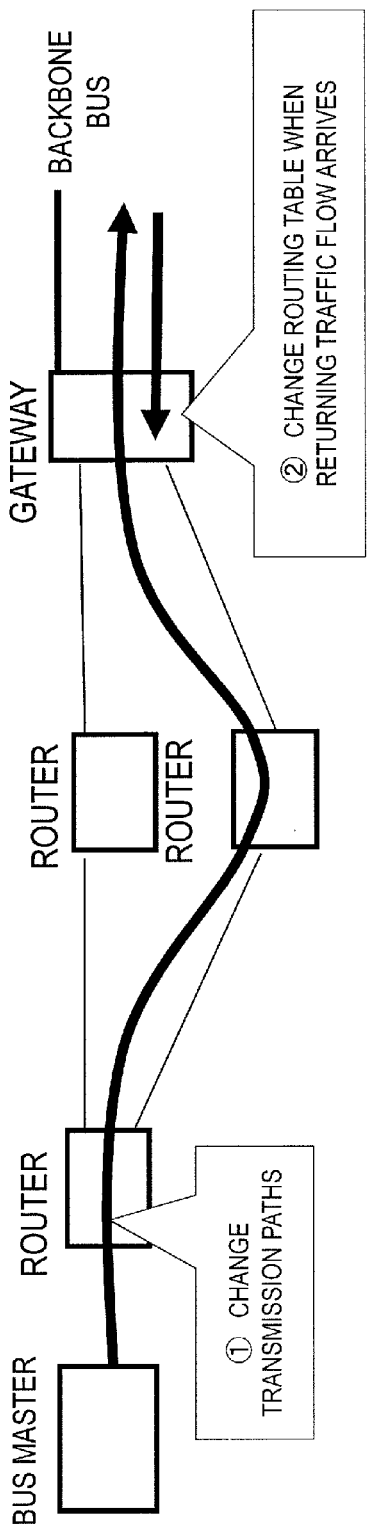
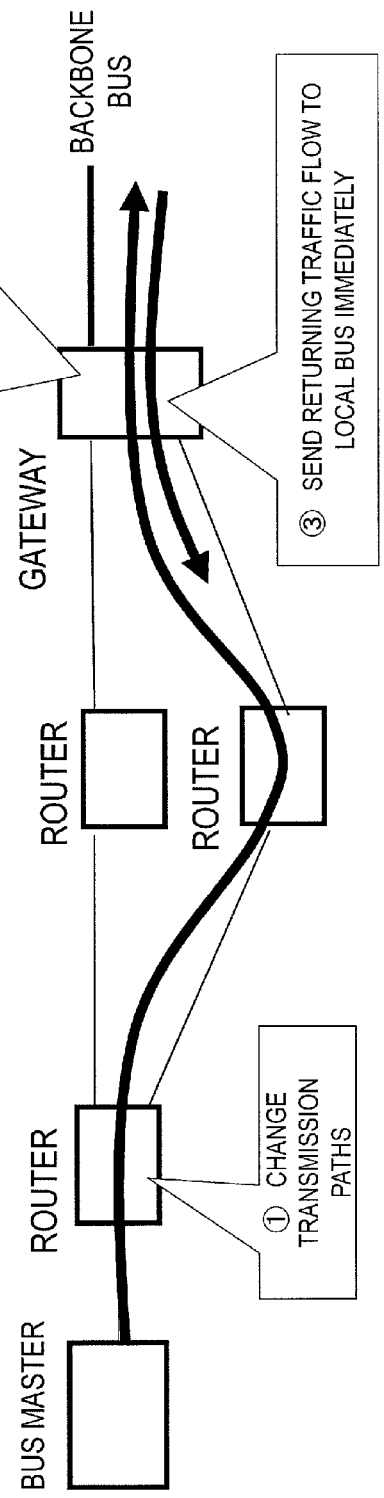
FIG.21A
FIG.21B

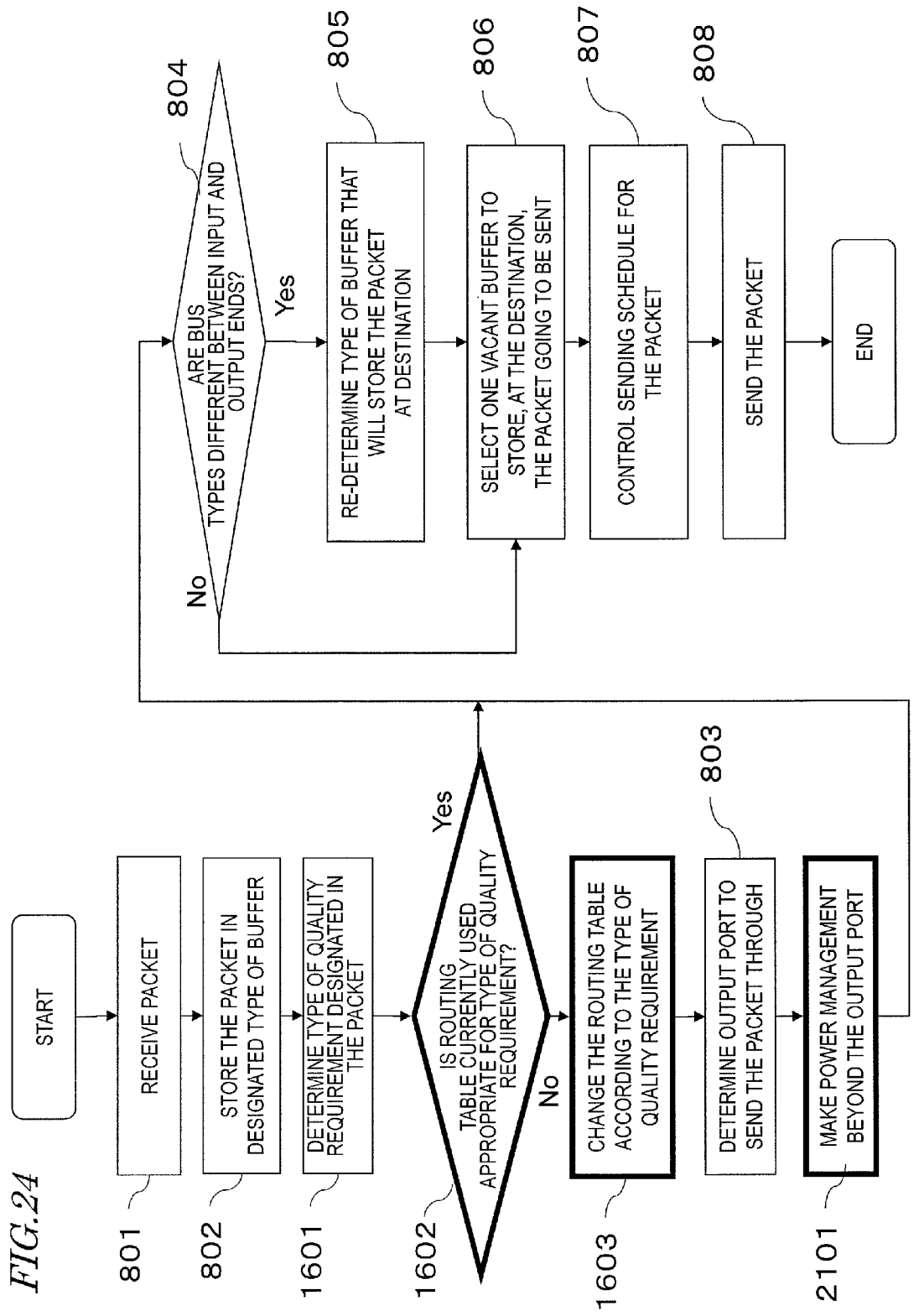

FIG.29

| BUS TYPE AT OUTPUT PORT END | TYPE OF QUALITY REQUIREMENT DESIGNATED IN PACKET (AS DESCRIBED IN ITS HEADER FLIT) | TYPE OF BUFFER AT DESTINATION ROUTER |
|---|---|---|
| BACKBONE BUS | 1* | Hi |
|  | 0* | Lo |
| LOCAL BUS | *1 | Hi |
|  | *0 | Lo |

2901a

* : 0 OR 1

| BUS TYPE AT OUTPUT PORT END | TYPE OF QUALITY REQUIREMENT DESIGNATED IN PACKET (AS DESCRIBED IN ITS HEADER FLIT) | TYPE OF BUFFER AT DESTINATION ROUTER |
|---|---|---|
| BACKBONE BUS | QUALITY ENSURED TYPE (11) | Hi |
| BACKBONE BUS | BEST-EFFORT LOW-DELAY TYPE (01) | Hi |
| BACKBONE BUS | BEST-EFFORT TYPE (00) | Lo |
| LOCAL BUS | QUALITY ENSURED TYPE (11) | Hi |
| LOCAL BUS | BEST-EFFORT LOW-DELAY TYPE (01) | Mid |
| LOCAL BUS | BEST-EFFORT TYPE (00) | Lo |

3101

ROUTER, METHOD FOR CONTROLLING ROUTER, AND COMPUTER PROGRAM

This is a continuation of International Application No. PCT/JP2012/007286, with an international filing date of Nov. 13, 2012, which claims priority of Japanese Patent Application No. 2011-251353, filed on Nov. 17, 2011, the contents of which are hereby incorporated by reference.

BACKGROUND

1. Technical Field

The present disclosure relates to a technology for controlling a sending schedule so that a plurality of traffic flows can run through a semiconductor integrated circuit with distributed buses while satisfying their quality requirements.

2. Description of the Related Art

There are various methods for performing a data transmission control on a semiconductor integrated circuit with buses. FIG. 1(a) illustrates an example of a lumped bus control. In a conventional integrated circuit that performs such a lumped bus control, a number of bus masters and a memory are connected together with a single bus, and accesses to the memory by the respective bus masters are arbitrated by an arbiter. By adopting such architecture, data can be transmitted while avoiding traffic interference between those bus masters and the memory. However, as the functionality of an integrated circuit has been further improved and as the number of cores in an integrated circuit has been further increased these days, the scale of the circuit has become even larger and the traffic flows running through the transmission path has gotten even more complicated. As a result, it has become increasingly difficult to design an integrated circuit by such a lumped bus control.

Meanwhile, semiconductor integrated circuits with distributed buses have been developed one after another lately by introducing parallel computerized connection technologies and network control technologies. FIG. 1(b) illustrates an example of such a distributed bus control. In a semiconductor integrated circuit with distributed buses, a number of routers (R) are connected together with multiple buses. Recently, people have been working on a so-called "Network on Chip (NoC)" in which the traffic flows in a large-scale integrated circuit are transmitted through a number of buses by adopting the distributed bus control such as the one shown in FIG. 1(b).

The qualities required for multiple traffic flows which are handled on a semiconductor integrated circuit vary according to the type of the source bus master, the type of the application, and the type and degree of priority of the traffic flow. FIG. 2 shows some exemplary types of transmission qualities which are classified according to the types of traffic flows to be handled on major integrated circuits. In the following example, a quality ensured type (A), a best-effort low-delay type (B), and a best effort type (C) will be described as three typical traffic flow types.

The quality ensured type traffic flow (A) always needs to ensure a predetermined quality with respect to any type of transmission performance such as delay or throughput. Examples of applications in which such a quality needs to be ensured include a voice call such as a phone call and operating a remote controller, which should be done in as real time possible.

The best-effort low-delay type traffic flow (B) needs to not only ensure a predetermined quality but also improve the quality of processing by increasing the transfer rate if there is any unused bus transmission band available. Such a requirement needs to be satisfied when the quality of each video frame played back should be improved by increasing, if there is any unused transmission band available, the coding rate while rendering each video frame of a predetermined quality in real time.

The best effort type traffic flow (C) just needs to be transmitted using an unused transmission band, in which no other traffic flows are running, and does not have to satisfy so rigid transmission quality requirement. Examples of such applications include Web applications and file transfers.

The quality requirements for these three types of traffic flows are given an order of priorities according to the rigidness of their quality requirement. In this example, the rigidness of the quality requirement is supposed to decrease in the order of quality ensured type (A), best-effort low-delay type (B), and best effort type (C).

If there are multiple traffic flows that need to satisfy mutually different types of quality requirements or if only a narrow bus transmission band is available for the total quantity of traffic flows to be transmitted, each of the routers R on the transmission path needs to sense the different types of traffic flow quality requirements from each other and control the traffic flow sending schedule according to the degrees of priorities given to their quality requirements in order to guarantee the performance required for the quality ensured type (A) and the best-effort low-delay type (B).

It should be noted that the traffic flow quality requirements do not have to be distinguished according to the types of the traffic flows but may also be sorted by any other standard. For example, if the type of every traffic flow is the quality ensured type (A), the required qualities may also be classified according to the time delay (i.e., the length of the time left before the deadline) permitted before the traffic flow arrives at the destination. Alternatively, the quality requirements may also be defined so that the shorter the time delay permitted for a traffic flow, the more rigid the quality requirement to be satisfied by (i.e., the higher the degree of priority given to) the traffic flow.

FIG. 3 illustrates a configuration for a conventional router.

In order to control the sending schedule by sensing the three different types of traffic flow quality requirements from each other, each conventional router provides a buffer dedicated to a quality ensured type traffic flow (A), a buffer dedicated to a best-effort low-delay type traffic flow (B), and a buffer dedicated to a best-effort type traffic flow (C). The (packets of each) traffic flow that has arrived at the router R are once classified and stored in their dedicated buffers.

A conventional router of this type is disclosed in Japanese Laid-Open Patent Publication No. 2004-56328, for example. Specifically, in Japanese Laid-Open Patent Publication No. 2004-56328, each router provides multiple dedicated buffers for respective types of traffic flows that need to satisfy mutually different types of quality requirements. Each of those dedicated buffers stores the packets of a traffic flow that needs to satisfy its associated type of quality requirement. The router controls the packet sending schedule in the order of priorities given to the respective traffic flows' quality requirements, and outputs the packets from the respective dedicated buffers according to the sending schedule determined.

Furthermore, the arbiter of the router sequentially connects buffers to the output port in the descending order of their level of quality requirement so that a buffer that needs to satisfy the highest level of quality requirement is given a top priority. In this manner, the sending schedule can be controlled according to the types of the quality requirements to be satisfied by the respective traffic flows.

SUMMARY

According to the conventional technologies described above, the sending schedule of respective traffic flows needs to be controlled with the constraint on the space left for the buffers taken into account.

A non-limiting exemplary embodiment of the present application provides a router which does not need such a dedicated buffer that has been provided for each type of quality requirement in order to store a traffic flow.

More specifically, one non-limiting, and exemplary embodiment provides a router for a bus system in order to relay packets. The bus system includes: at least one bus master; a first bus; and a second bus which connects the at least one bus master and the first bus together and on which the router is arranged. The at least one bus master outputs packets including information about at least one of (N+1) predetermined types of quality requirements. The second bus transmits packets designating at most N types of quality requirements. The router includes: an input port configured to receive the packets including the information about the quality requirements; a buffer section including at most N different types of buffers to classify and store the packets by reference to the information about the types of quality requirements which is included in the packets received; a buffer allocating section configured to determine, according to the type of the given quality requirement, in which of a destination router's buffers of the at most N different types the packets need to be stored if a bus type changes at the destination router; and a sending control section configured to control sending the packets by arranging their sending schedule so that the packets that are stored in the buffer section are sent in the descending order of their level of the quality requirement. The router controls the traffic flow sending schedule by sensing a difference between the (N+1) different types of quality requirements.

This general and particular aspect can be implemented as a system, a method, a computer program or a combination thereof.

When multiple traffic flows with mutually different types of quality requirements are transmitted through a semiconductor integrated circuit, a router according to an aspect of the present disclosure can control the sending schedule with the quality requirement satisfied on a traffic flow basis and with an increase in the number of buffers to use in the router checked. Since the increase in the number of buffers to use can be checked, the chip area to be occupied by the integrated circuit can be cut down effectively.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

Portion (a) of FIG. 1 illustrates an example of a lumped bus control and protion (b) of FIG. 1 illustrates an example of a distributed bus control.

FIG. 2 shows some exemplary types of transmission qualities which are classified according to the types of traffic flows to be handled on major integrated circuits.

FIG. 8 shows an exemplary set of information to be managed by a bus type comparing section 709.

FIGS. 11A and 11B show exemplary routing tables.

FIG. 14 shows a difference in the type of the storage buffer between the local buses and the backbone bus in the configuration shown in FIG. 13.

FIG. 16 shows a difference in the type of the storage buffer to use between the local buses and the backbone bus in the configuration shown in FIG. 15.

Figure 17:
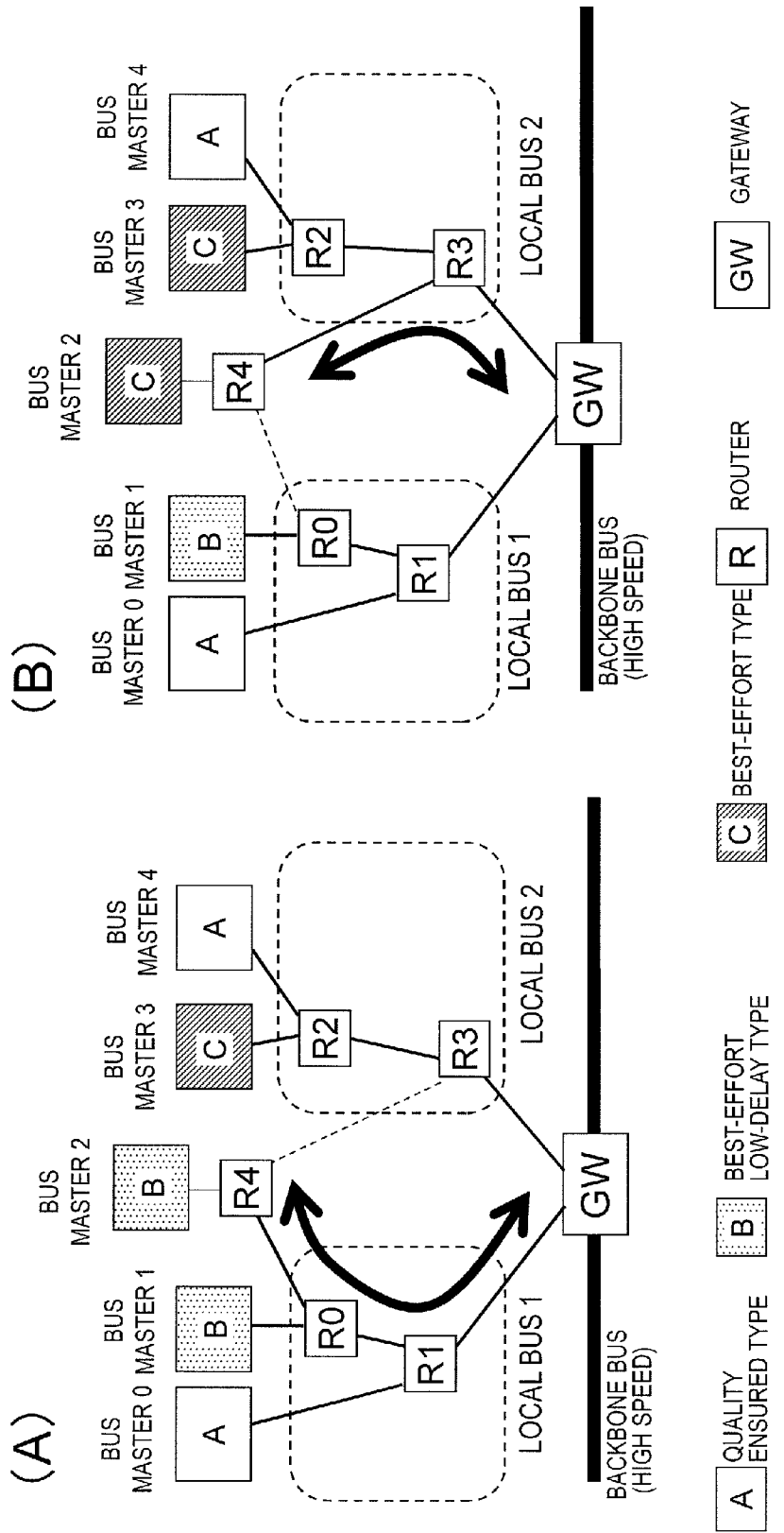

Portions (A) and (B) of FIG. 17 outline a second embodiment.

Figure 18:
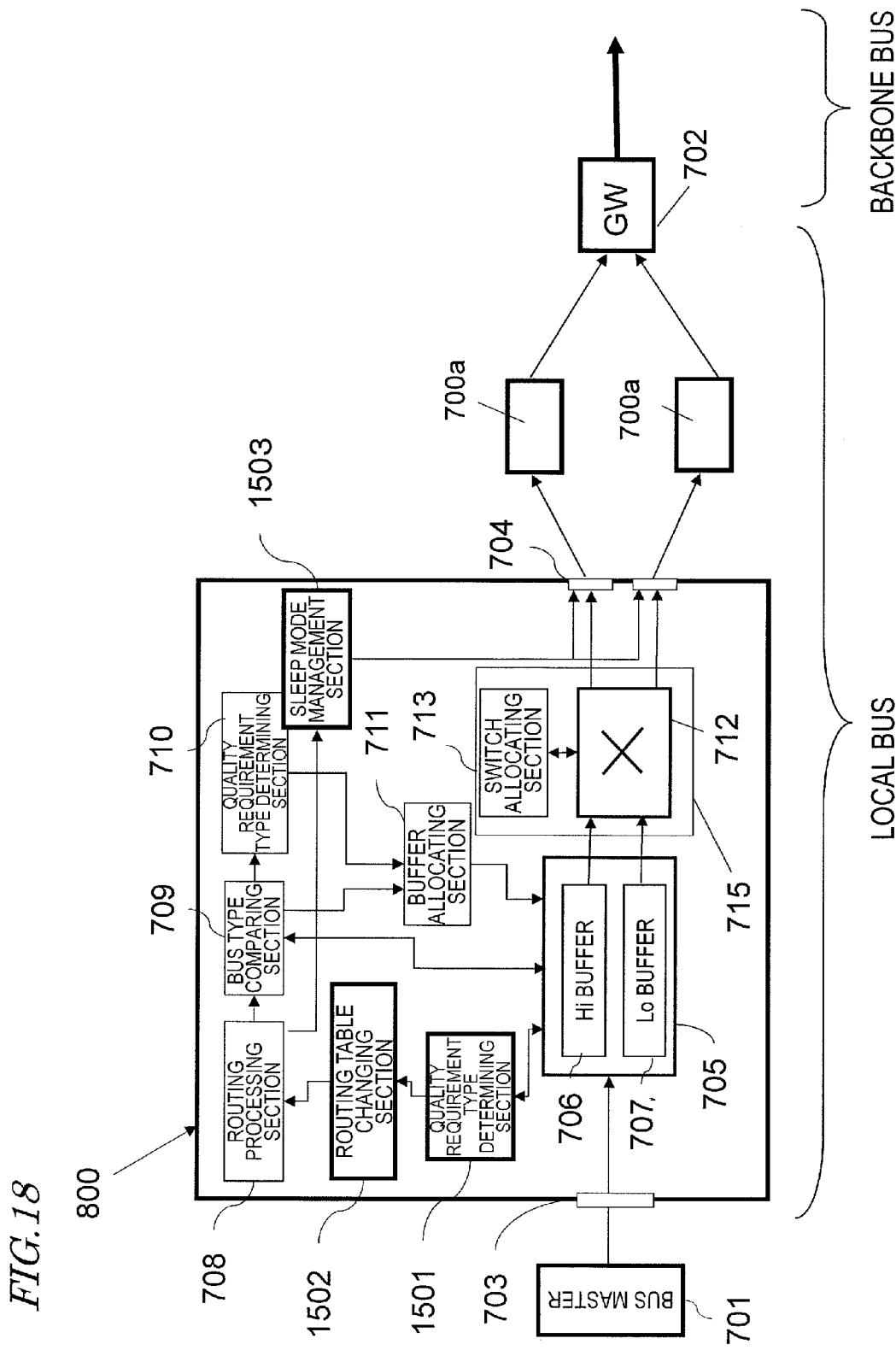

FIG. 18 illustrates a configuration for a router 800 and a gateway 702 according to the second embodiment.

Figure 19:
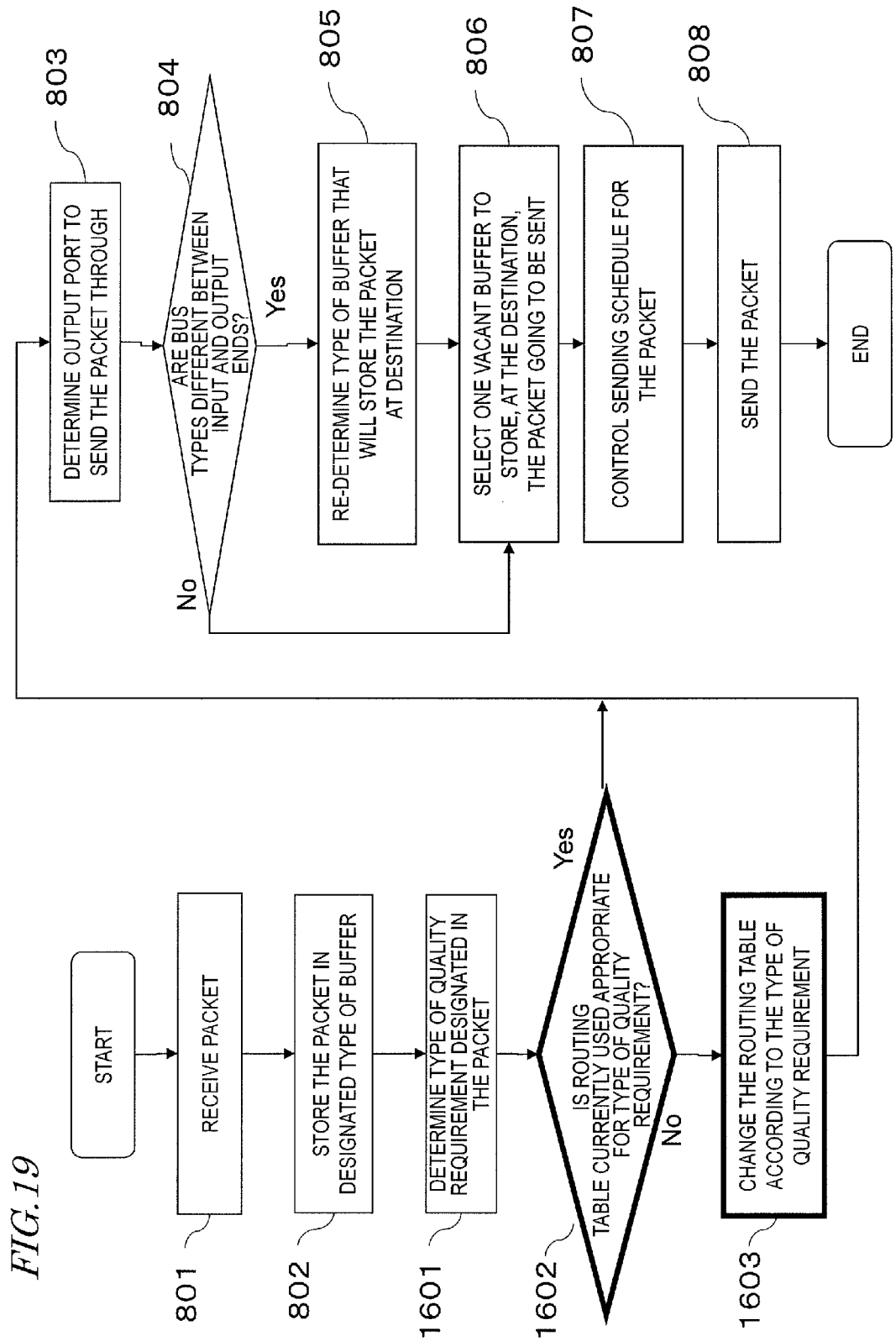

FIG. 19 shows a flowchart showing a procedure in which the router 800 (or gateway 702) of the second embodiment operates.

FIG. 20 shows routing tables for use in the router R4 of the second embodiment shown in FIG. 17.

FIGS. 21A and 21B show a method for shortening the processing time it will take to change the transmission paths of a traffic flow returning from the backbone bus to a bus master in a situation where the transmission paths of a traffic flow running from the bus master to the backbone bus have been changed responsive to the change of the type of quality requirement.

Figure 22:
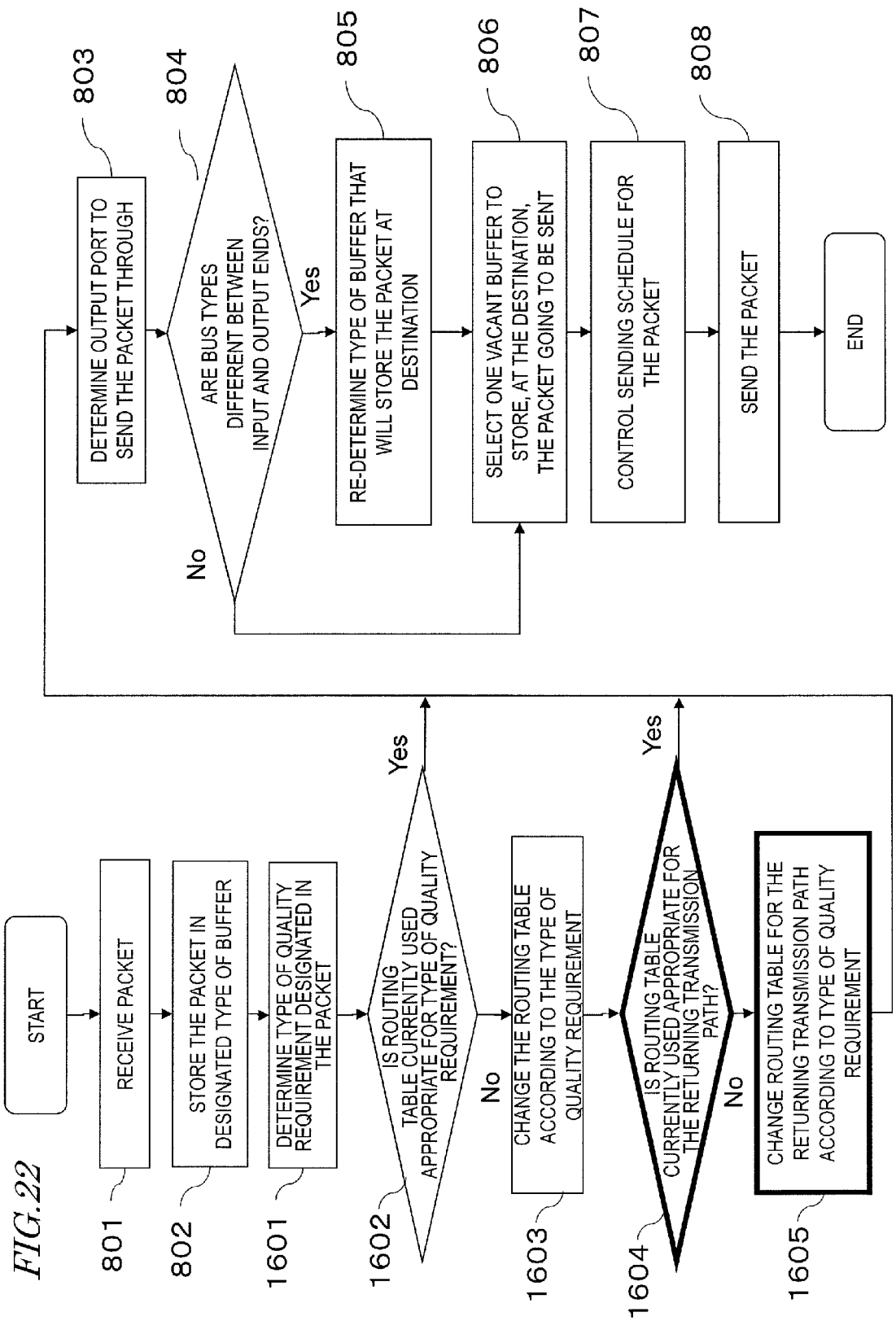

FIG. 22 shows a flowchart showing the procedure of operation of the router 700 including the processing step of changing the returning transmission paths from the backbone bus to the bus master.

Figure 23A:
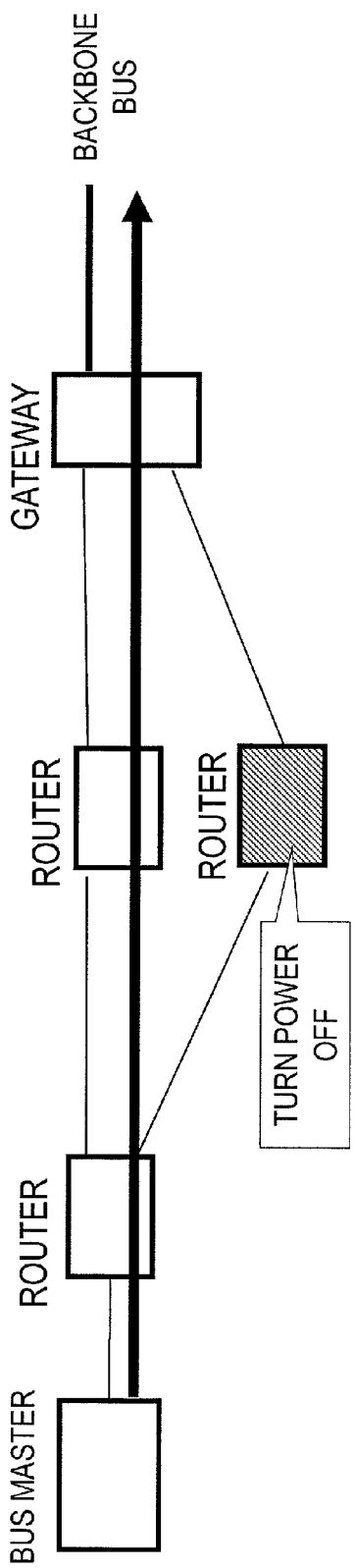
Figure 23B:
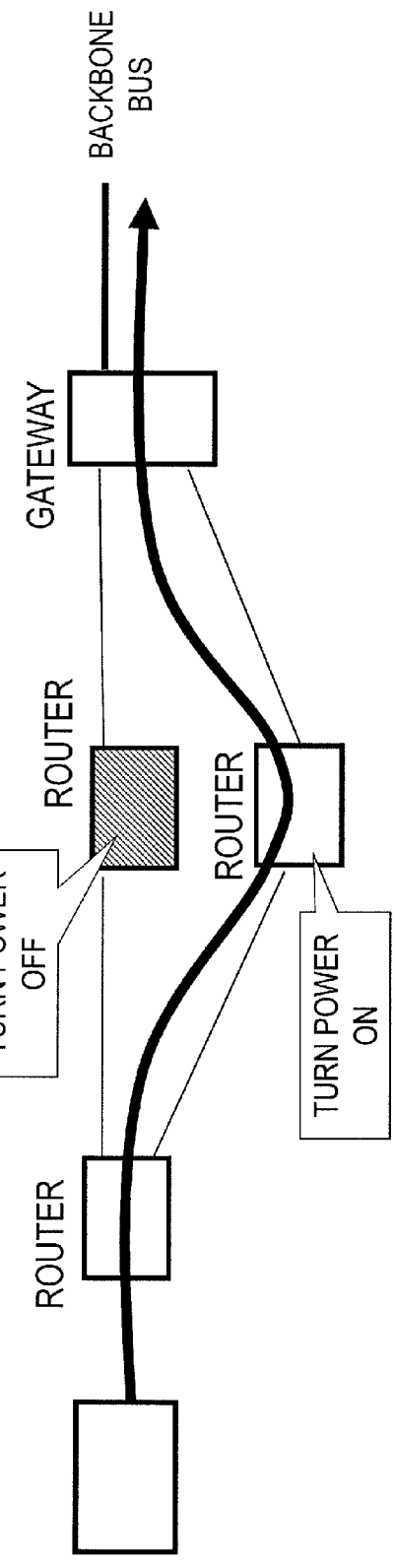

FIGS. 23A and 23B show how to make a power management when the transmission paths are changed responsive to a change of the type of quality requirement.

FIG. 24 shows a flowchart showing how the router 800 makes a power management.

Figure 25:
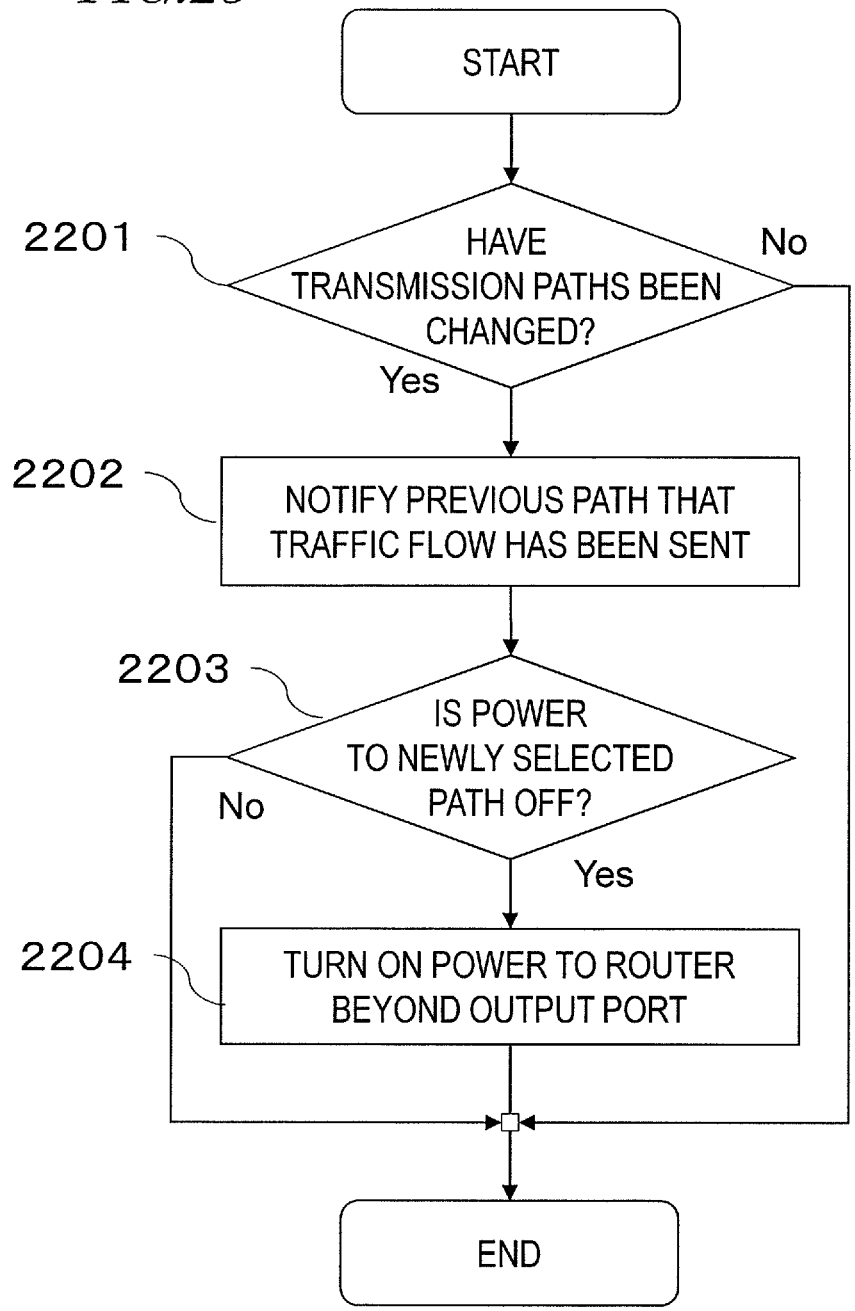

FIG. 25 shows a flowchart showing how a sleep mode management section 1503 operates.

Figure 26:
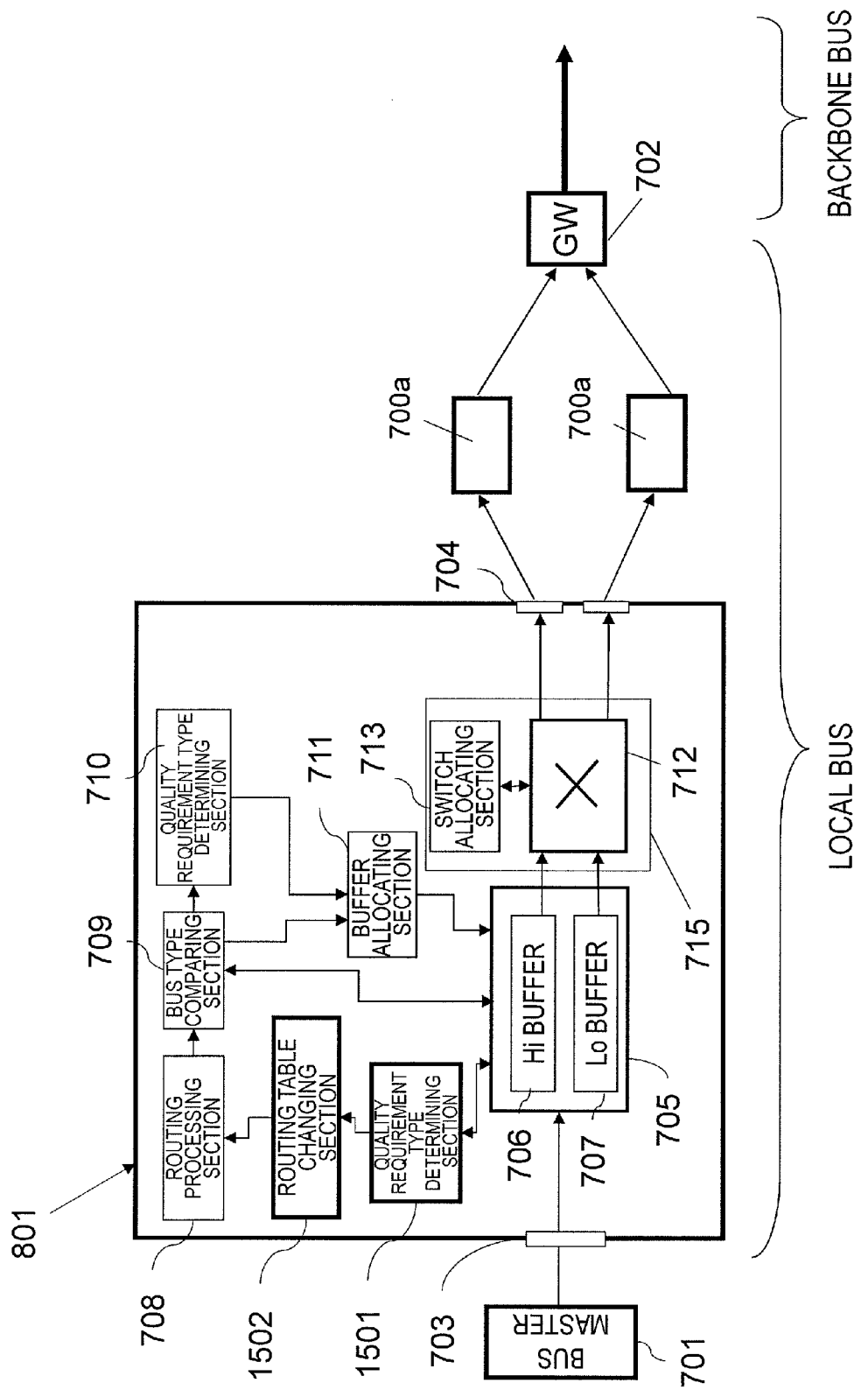

FIG. 26 shows a block diagram illustrating a configuration for a router 801 as a modified example of the second embodiment.

Figure 27:
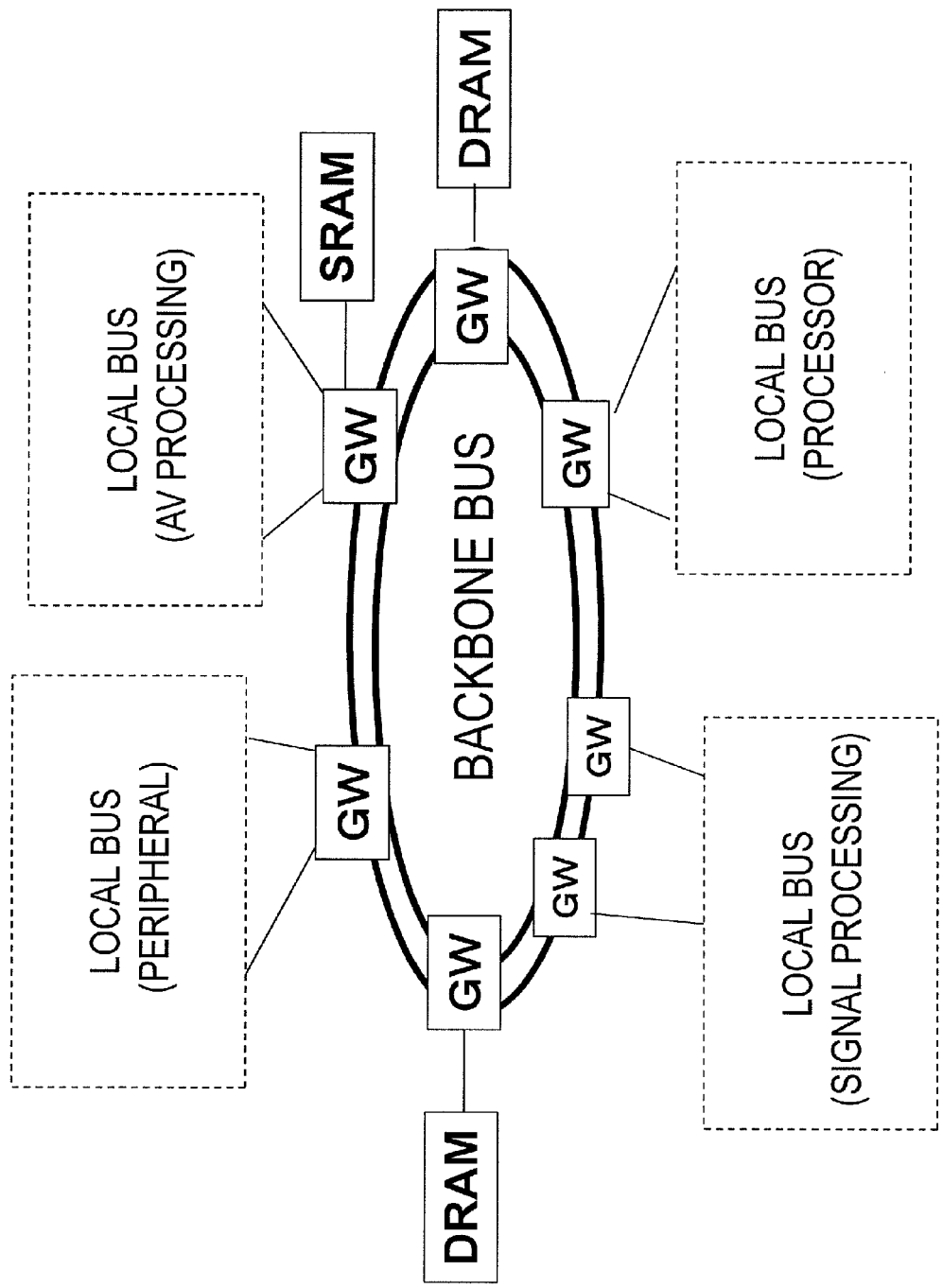

FIG. 27 illustrates an exemplary application of the present disclosure.

Figure 28:
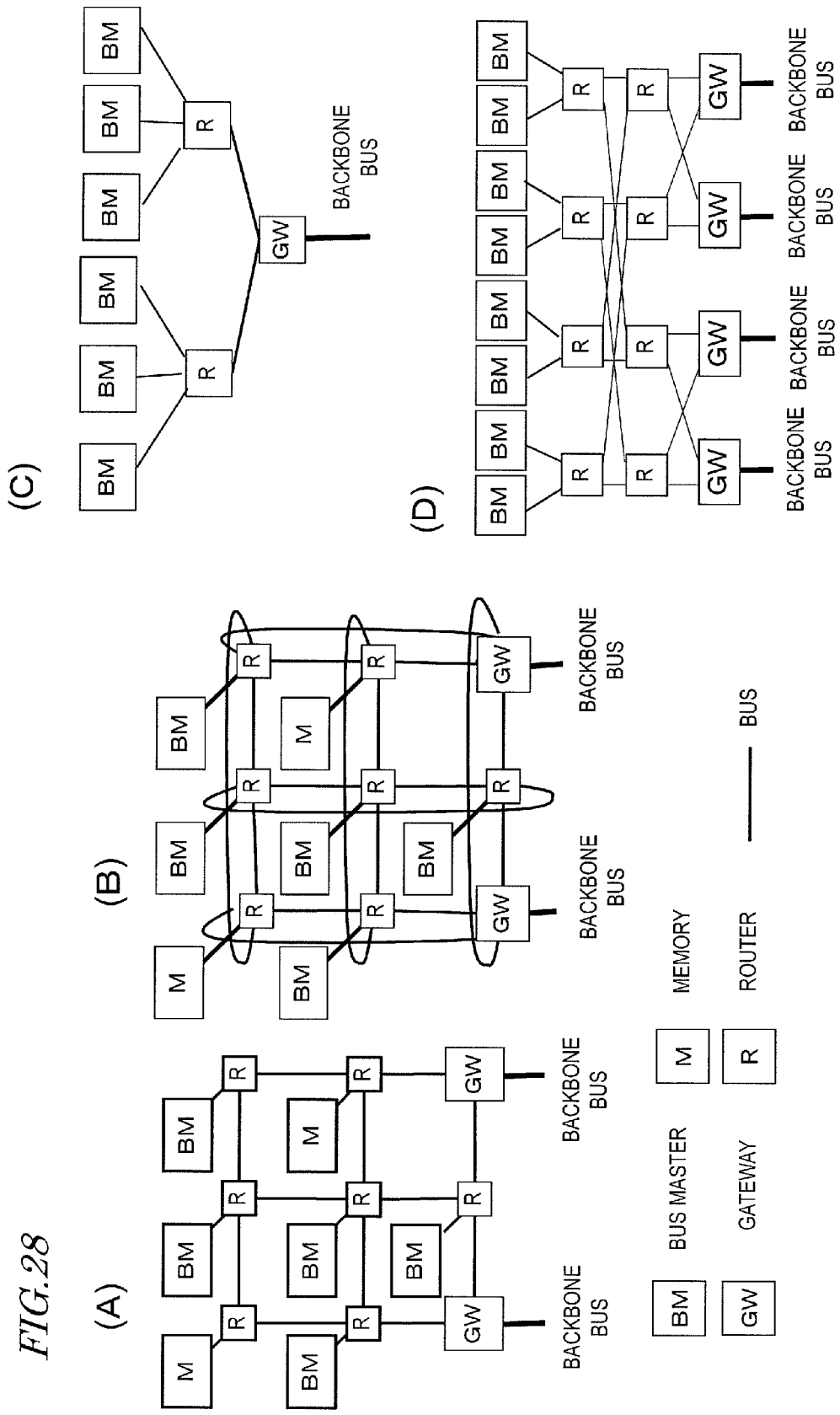

Portions (A) through (D) of FIG. 28 illustrate some examples of alternative topologies for local buses.

FIG. 29 shows an example of the quality requirement type determining rule 2901a retained in a quality requirement type determining section 710.

Figure 5:
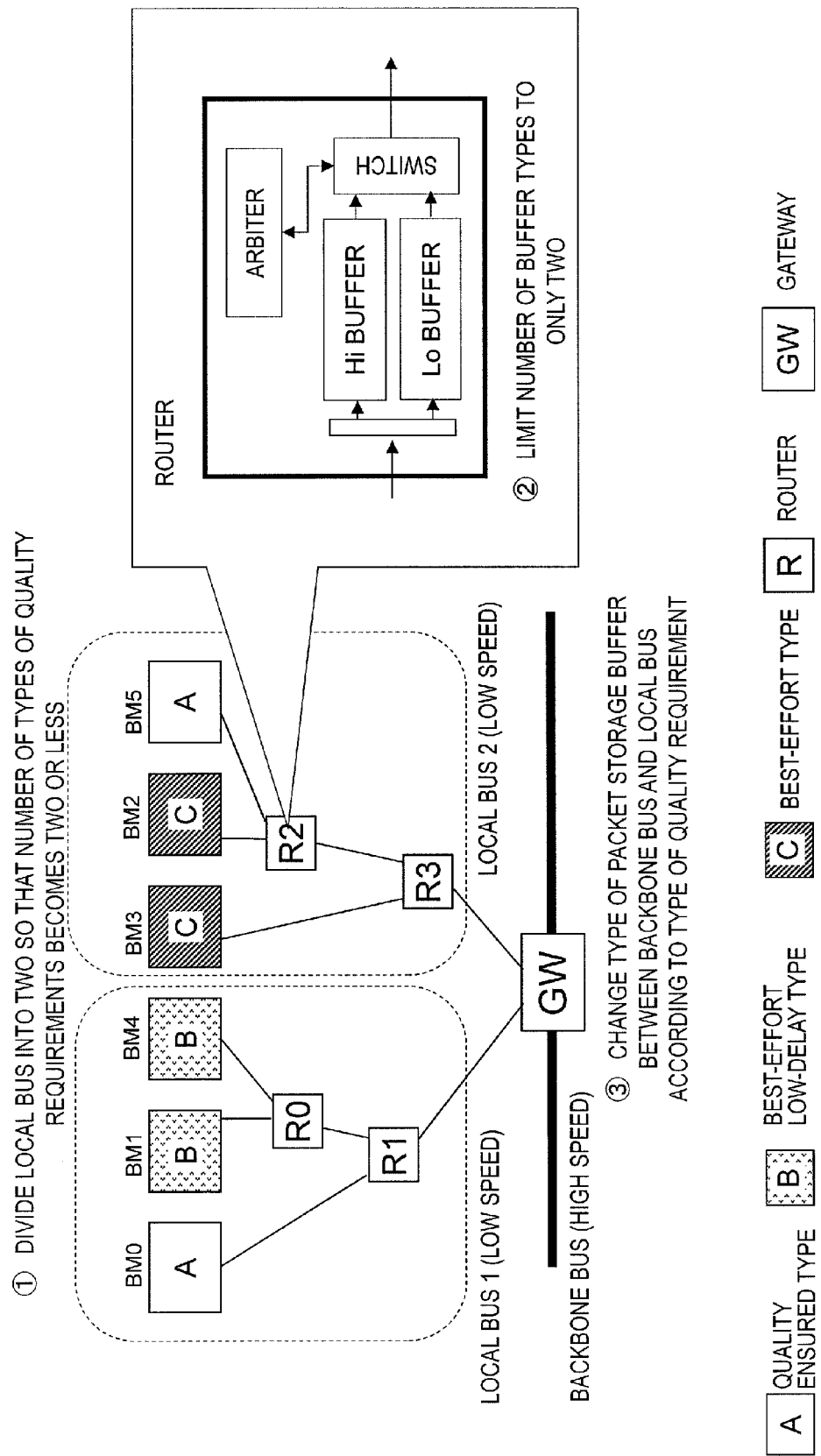
FIG. 5 illustrates exemplary architecture in which three kinds of bus masters BM with mutually different types of quality requirements are connected to a backbone bus through local buses which are comprised of four routers and one gateway.
Figure 30:
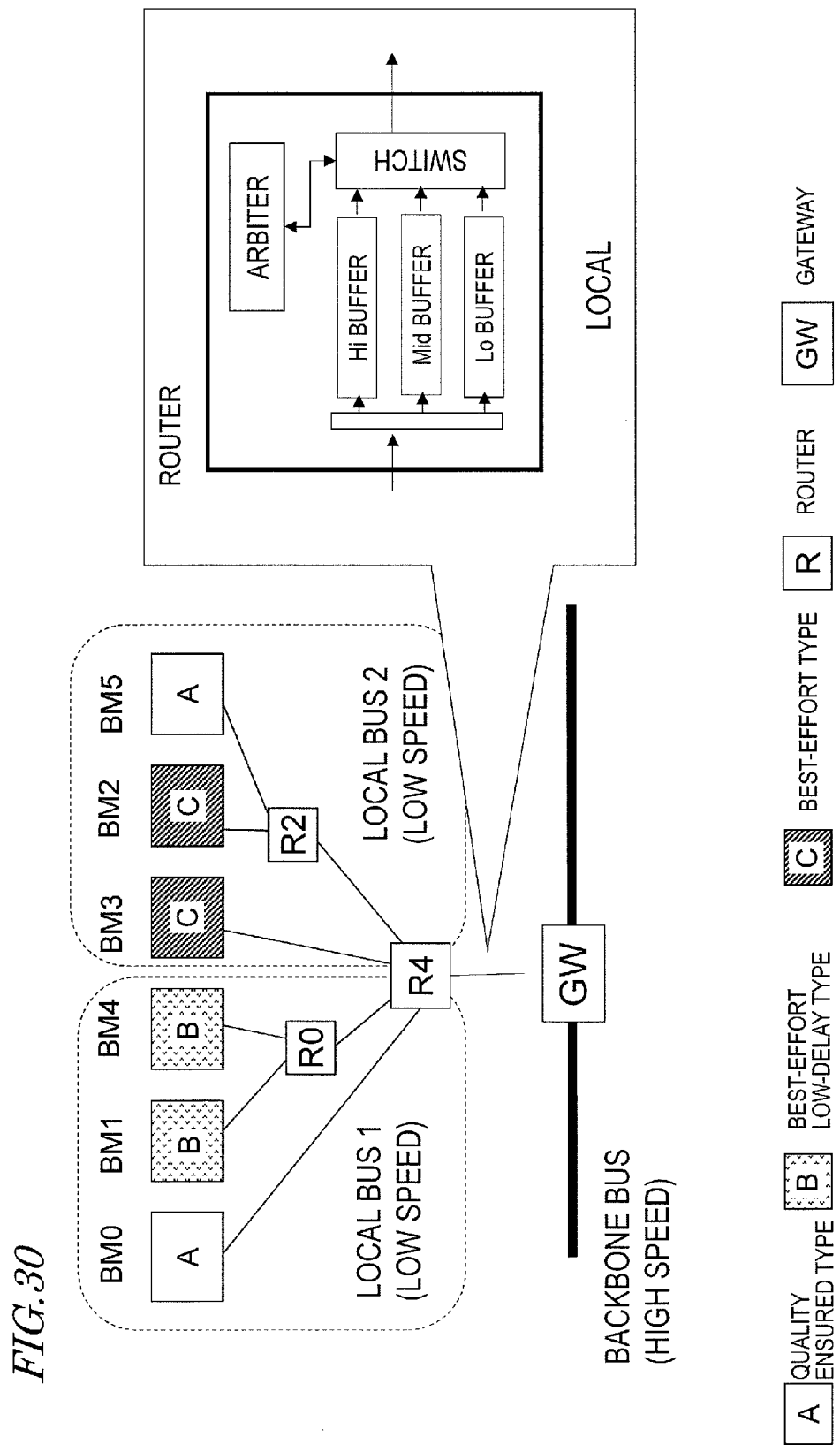

FIG. 30 illustrates, as a modified example of the configuration shown in FIG. 5, a configuration in which the routers R1 and R3 are aggregated into a single router R4.

Figure 31:
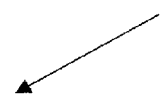

FIG. 31 shows an example of the quality requirement type determining rule 3101 for the gateway GW shown in FIG. 30.

Figure 32:
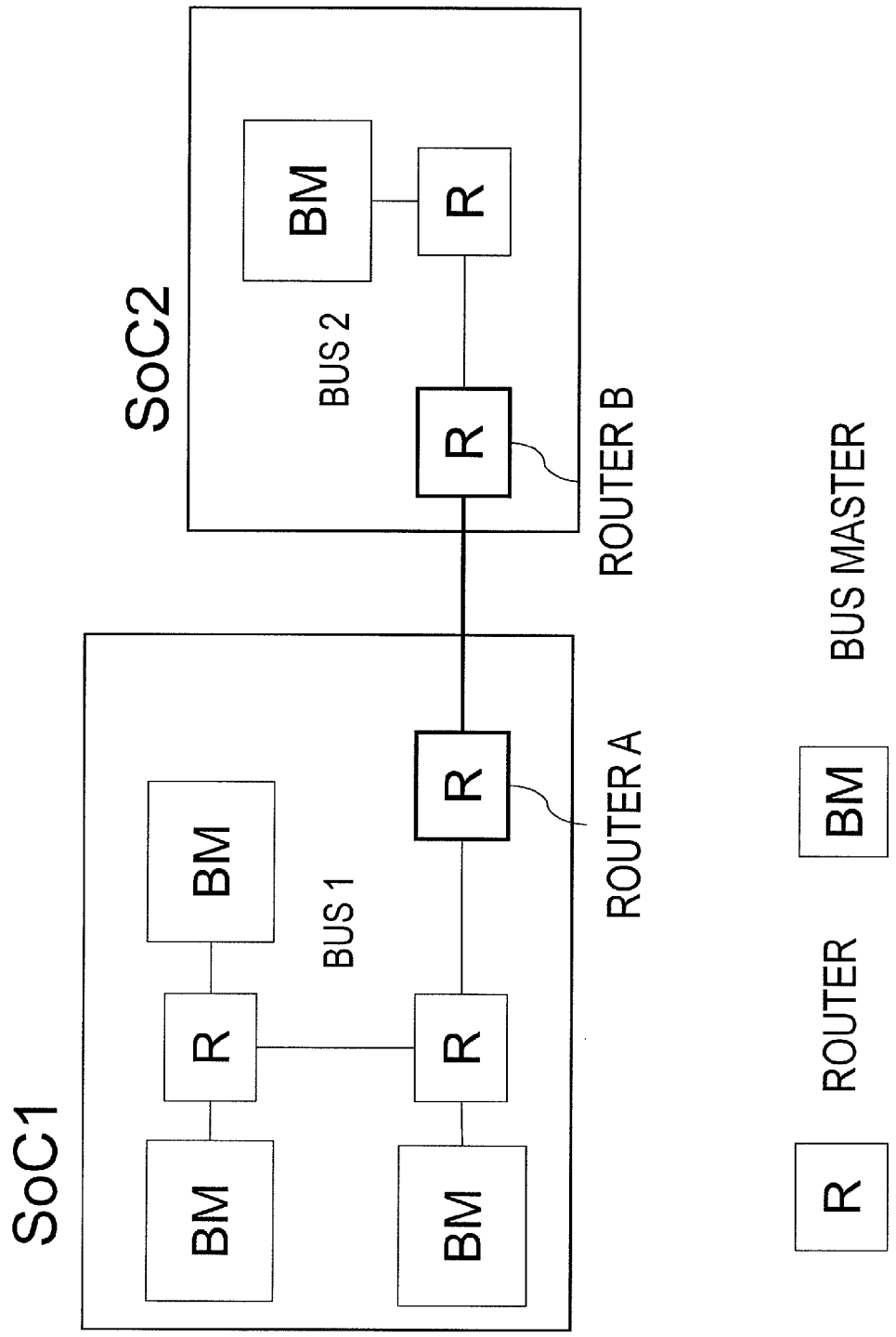

FIG. 32 illustrates an example of a bus system for another semiconductor integrated circuit

DETAILED DESCRIPTION

The present inventors looked into those problems with the conventional routers.

Specifically, in some conventional routers, in order to control the sending schedule on a traffic flow basis by sensing their difference in quality requirement, dedicated buffers are provided for respective types of traffic flows with different quality requirements. However, if the number of buffers provided is the same as the number of the types of quality requirements, the area occupied by those buffers in the router will increase with the number of different types of buffers. The same can be said even if such a configuration is applied to a gateway on the same network.

On a semiconductor integrated circuit, the total area occupied by buffers in a router or gateway needs to be reduced to cut down the implementation cost. For that reason, compared to a router to be used in a parallel computer, an ATM exchanger and the Internet, more rigid constraint is imposed on the size of the buffer available in a router on a semiconductor integrated circuit. That is why it is difficult to apply the conventional technologies as they are to the router of the latter type.

Also, every time the definition of a traffic flow quality requirement is changed due to a change to the specifications, the configuration of buffers in a router or gateway in a semiconductor integrated circuit needs to be redesigned. And as the area occupied by those buffers also changes, the arrangement of the router or gateway on the integrated circuit needs to be redesigned, too.

As can be seen, in a router R or gateway GW on a semiconductor integrated circuit, the sending schedule needs to be controlled according to each traffic flow's quality requirement without increasing the total area occupied by the buffers. In a general network through which data is typically transmitted compliant with the Ethernet™ standard, some increase in the total area of buffers is permissible. However, it is currently difficult to permit such an increase in the total area of the buffers in a router on a semiconductor integrated circuit, for example.

An aspect of the present disclosure can be outlined as follows.

A router according to an aspect of the present disclosure is provided for a bus system in order to relay packets. The bus system includes: at least one bus master; a first bus; and a second bus which connects the at least one bus master and the first bus together and on which the router is arranged. The at least one bus master outputs packets including information about at least one of (N+1) predetermined types of quality requirements. The second bus transmits packets designating at most N types of quality requirements. The router includes: an input port configured to receive the packets including the information about the quality requirements; a buffer section including at most N different types of buffers to classify and store the packets by reference to the information about the types of quality requirements which is included in the packets received; a buffer allocating section configured to determine, according to the type of the given quality requirement, in which of a destination router's buffers of the at most N different types the packets need to be stored if a bus type changes at the destination router; and a sending control section configured to control sending the packets by scheduling sending order of the packets so that the packets that are stored in the buffer section are sent in the descending order of their level of the quality requirement. And the router controls sending schedule of traffic flows by sensing a difference between the (N+1) different types of quality requirements.

In one embodiment, the number of the (N+1) different types of quality requirements is three. On the second bus, the traffic flows to be stored in the buffer section has at most two different types of quality requirements. And the N types of buffers are first and second buffers to classify two different types of traffic flows on which mutually different types of quality requirements are imposed.

In one embodiment, in the packets, stored are information about the quality requirement imposed on the first bus and information about the quality requirement imposed on the second bus. The buffer section classifies and stores the packets according to the type of the bus to which the input port that has received the packets is connected, the type of the bus at the destination of the packets, and the type of the buffer defined according to the type of the quality requirement.

In one embodiment, the quality requirement imposed on the first bus is different from the quality requirement imposed on the second bus.

In one embodiment, transmission paths to be used by the bus master are changed according to the type of quality requirement indicated by the information about the quality requirement that is stored in the packets.

In one embodiment, the router further includes: a quality requirement type determining section configured to determine the type of quality requirement in the packets by reference to the information about the quality requirement that is stored in the packets; and a routing table changing section which changes the contents of a routing table that defines the transmission paths of the packets according to the type of the quality requirement that has been determined.

In one embodiment, the quality requirement type determining section determines whether or not the type of the quality requirement in the packets has been changed, and the routing table changing section defines a transmission path for a traffic flow that returns from the first bus to the second bus with respect to packets being sent.

In one embodiment, the router further includes a power management section configured to control the sleep mode of an adjacent router. The power management section controls the ON and OFF states of functions of the adjacent router when the transmission paths are changed in response to a change of the type of quality requirement.

In one embodiment, the router further includes a power management section configured to control the sleep mode of the router itself. The power management section controls the ON and OFF states of at least some functions of the router itself when the transmission paths are changed in response to a change of the type of quality requirement.

A router controlling method according to another aspect of the present disclosure is a method for controlling a router to be provided for a bus system in order to relay packets. The bus system includes: at least one bus master; a first bus; and a second bus which connects the at least one bus master and the first bus together and on which the router is arranged. The at least one bus master outputs packets including information about at least one of (N+1) types of quality requirements which have been prioritized in advance. The second bus transmits packets designating at most N types of quality requirements. The router includes: an input port which receives the packets including the information about the quality requirements; and a buffer section including N different types of buffers to classify and store the packets by reference to the information about the types of quality requirements. The controlling method includes the steps of: determining, according to the type of the given quality requirement, in which of a destination router's buffers of the at most N different types the packets need to be stored if a bus type changes at the destination router; allocating the packets to transmission paths so that the packets that are stored in the buffer section are sent in the descending order of their level of the quality requirement; and outputting the packets to which the transmission paths have been allocated as a result of the step of allocating, whereby the sending schedule of traffic flows is controlled by sensing a difference between the (N+1) different types of quality requirements.

A computer program according to still another aspect of the present disclosure is used to carry out a simulation on a router to be provided for a bus system in order to relay packets. The bus system includes: at least one bus master; a first bus; and a second bus which connects the at least one bus master and the first bus together and on which the router is arranged. The at least one bus master outputs packets including information about at least one of (N+1) types of quality requirements which have been prioritized in advance. The second bus transmits packets designating at most N types of quality requirements. The computer program is defined to make a computer perform the steps of: receiving the packets representing the at most N types of quality requirements at the input port of the router; classifying and storing the packets in at most N different types of buffers of the router by reference to information about the types of quality requirements included in the packets received; determining, according to the type of the given quality requirement, in which of a destination router's buffers of the at most N different types the packets need to be stored if a bus type changes at the destination router; allocating the packets to transmission paths so that the packets that are stored in the buffer section are sent in the descending order of their level of the quality requirement; and outputting the packets to which the transmission paths have been allocated as a result of the step of allocating.

A router according to yet another aspect of the present disclosure is provided for a bus system which includes first and second buses in order to relay packets by connecting the first and second buses together. The first bus transmits packets representing at most (N+1) types of quality requirements. The second bus transmits packets designating at most N types of quality requirements. The router includes: an input port configured to receive the packets including information about the at most (N+1) types of quality requirements; a buffer section including at most N different types of buffers to classify and store the packets by reference to the information about the types of quality requirements which is included in the packets received; a buffer allocating section configured to determine, according to the type of the given quality requirement, in which of the at most N different types of buffers of a destination router that is arranged on the second bus the packets need to be stored; and a sending control section configured to control sending the packets by scheduling sending order of the packets so that the packets that are stored in the buffer section are sent in the descending order of their level of the quality requirement.

A router controlling method according to yet another aspect of the present disclosure is a method for controlling a router to be provided for a bus system which includes first and second buses in order to relay packets by connecting the first and second buses together. The first bus transmits packets representing at most (N+1) types of quality requirements. The second bus transmits packets designating at most N types of quality requirements. The controlling method includes the steps of: receiving the packets including information about the at most (N+1) types of quality requirements at the input port of the router; classifying and storing the packets in at most N different types of buffers by reference to the information about the types of quality requirements which is included in the packets received; determining, according to the type of the given quality requirement, in which of the at most N different types of buffers of a destination router that is arranged on the second bus the packets need to be stored; and controlling sending the packets by scheduling sending order of the packets so that the packets that are stored in the at most N types of buffers are sent in the descending order of their level of the quality requirement.

A computer program according to yet another aspect of the present disclosure is used to carry out a simulation on a router to be provided for a bus system which includes first and second buses in order to relay packets by connecting the first and second buses together. The first bus transmits packets representing at most (N+1) types of quality requirements. The second bus transmits packets designating at most N types of quality requirements. The computer program is defined to make a computer perform the steps of: receiving the packets including information about the at most (N+1) types of quality requirements at the input port of the router; classifying and storing the packets in at most N different types of buffers of the router by reference to the information about the types of quality requirements which is included in the packets received; determining, according to the type of the given quality requirement, in which of the at most N different types of buffers of a destination router that is arranged on the second bus the packets need to be stored; and controlling sending the packets by scheduling sending order of the packets so that the packets that are stored in the at most N types of buffers are sent in the descending order of their level of the quality requirement.

Hereinafter, embodiments of a router and simulation program to design and verify the router to be implemented on a chip according to the present disclosure will be described with reference to the accompanying drawings.

Figure 1:
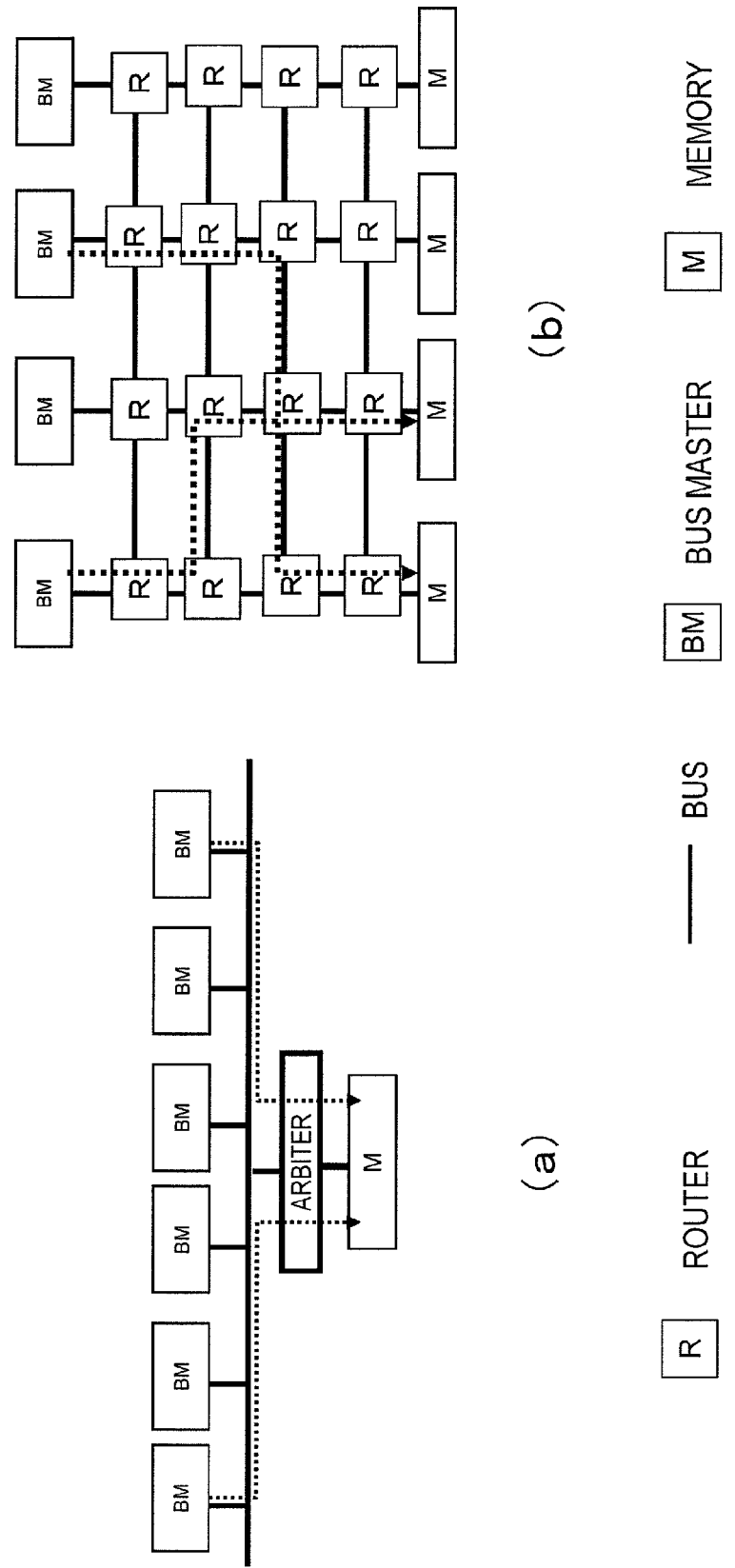
Figure 3:
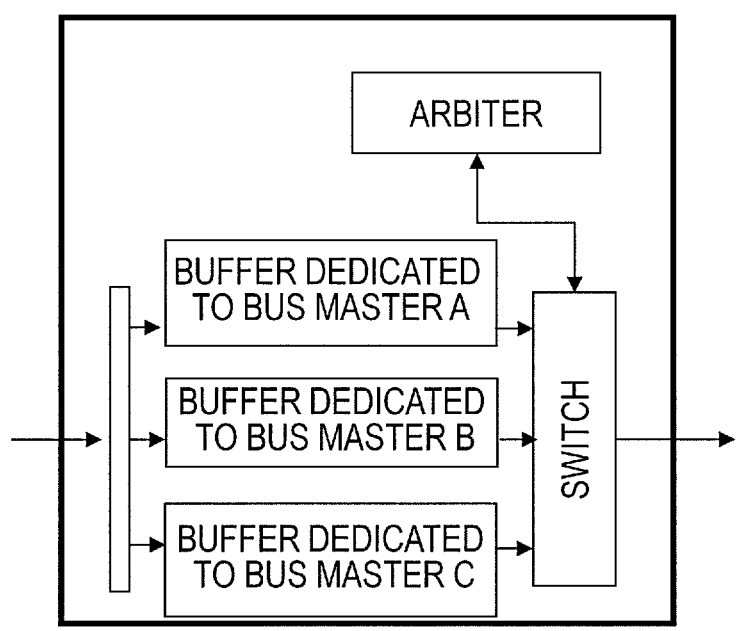
FIG. 3 illustrates a configuration for a conventional router.
Figure 4:
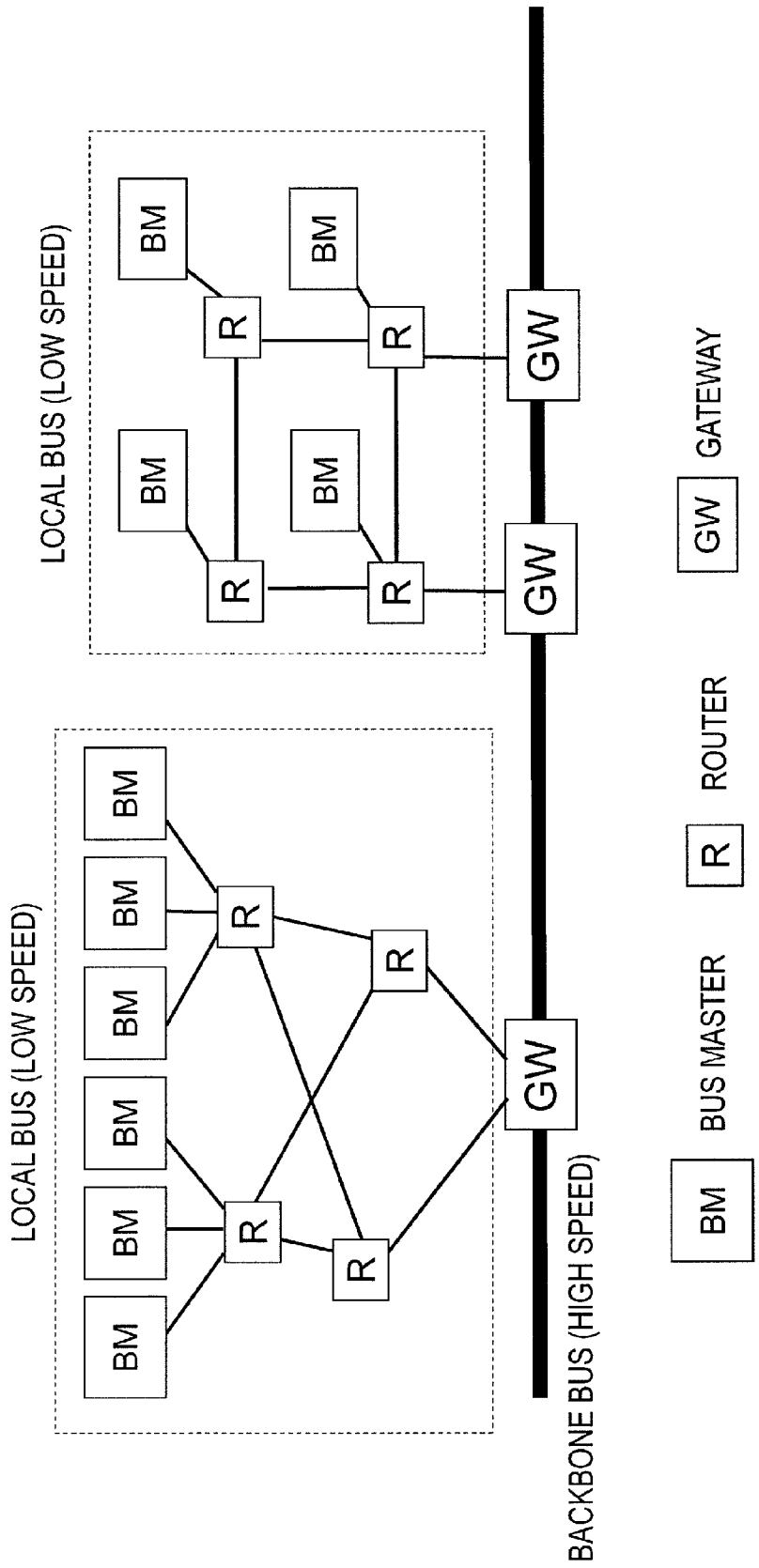
FIG. 4 illustrates network architecture for a semiconductor integrated circuit which is connected with distributed buses.

FIG. 4 illustrates network architecture for a semiconductor integrated circuit which is connected with distributed buses to which the present disclosure is supposed to be applied. Such a network will be sometimes referred to herein as a "bus system for a semiconductor integrated circuit".

Although bus masters are illustrated on the drawings as elements that form local buses, bus masters do not have to be counted among those elements. That is to say, a transmission path which connects bus masters and a gateway GW together may be regarded as a "local bus". In the examples illustrated on the drawings to be referred to in the following description, bus masters and routers are sometimes included in a single local bus but sometimes not. For example, if a plurality of local buses are connected to the same backbone bus, those local buses including bus masters are collectively illustrated as a single set for convenience sake. However, such illustration is adopted just for the sake of convenience and those bus masters do not have to be included in the local bus.

If the transmission bandwidth of the buses were broadened everywhere on the entire integrated circuit in order to cope with an increase in traffic rate or circuit size, then the power should be saved on the buses excessively or the paths to be laid out would get too much complicated. Thus, to overcome such a problem, in an integrated circuit to which the present disclosure is intended to be applied, a bus with a broad transmission bandwidth is laid out as a first type of bus which is congested with multiple traffic flows (which will be referred to herein as a "backbone bus"), while the backbone bus is connected to respective bus masters through a second type of buses with a narrow transmission bandwidth (which will be referred to herein as "local buses").

By using a bus with such a broad transmission bandwidth only in a limited area on an integrated circuit in this manner, it is possible to prevent the power dissipation from increasing too much and the layout of the buses from getting too much complicated.

A number of local buses may be arranged with respect to a single backbone bus. And by changing the number or connection of routers that form those local buses, the layout can be adapted to the intended use.

Exchange of traffic flows between the backbone bus and the local buses is operated through a gateway. The gateway not only performs the same function as the routers in the local network but also transmits a traffic flow between buses with mutually different transmission bandwidths.

The bandwidth of transmission between the backbone bus and the local buses can be broadened by increasing the number of gateways provided.

FIG. 5 illustrates exemplary architecture in which three kinds of bus masters BM with mutually different types of quality requirements are connected to a backbone bus through local buses which are comprised of four routers and one gateway.

First of all, the quality requirements will be described. In this example, a given traffic flow is supposed to satisfy one of quality ensured type (A), best-effort low-delay type (B), or best effort type (C) quality requirement according to its own type. Multiple traffic flows are given respective degrees of priorities in the descending order of their level of quality requirement. Specifically, in this example, the degrees of priorities are supposed to decrease in the order of quality ensured type (A), best-effort low-delay type (B), and best effort type (C). It should be noted that these degrees of priorities are already known when a semiconductor integrated circuit network or NoC is designed.

To get a traffic flow transmitted according to the type of quality requirement without increasing the number of types of buffers in each of the routers and in the gateway, according to this embodiment, (1) multiple bus masters that use the same gateway GW are supposed to belong to multiple local buses so that at most two types of quality requirements are imposed on traffic flows that pass through the respective routers.

In addition, (2) each of the routers R and the gateway GW is supposed to have only two types of buffers, namely, a Hi buffer to store packets with the higher type of quality requirement and a Lo buffer to store packets with the lower type of quality requirement, thereby minimizing an increase in the total area of the buffers in each router R. Furthermore, in transmitting a traffic flow between the classified local buses and the backbone bus, (3) the type of the buffer to store the packets is changed according to the type of the quality requirement. Specifically, in the example illustrated in FIG. 5, the local buses are classified into Local Bus 1 including routers R0 and R1 and Local Bus 2 including routers R2 and R3.

As a result, only a quality ensured traffic flow (A) and a best-effort low-delay type traffic flow (B) are transmitted through Local Bus 1, and only a quality ensured traffic flow (A) and a best effort type traffic flow (C) are transmitted through Local Bus 2.

In Local Bus 1, the quality ensured type traffic flow (A) is transmitted via the Hi buffer and the best-effort low-delay type traffic flow (B) is transmitted via the Lo buffer. On the other hand, in Local Bus 2, the quality ensured type traffic flow (A) is transmitted via the Hi buffer and the best effort type traffic flow (C) is transmitted via the Lo buffer.

The sending schedule is controlled for the respective routers R and the gateway GW so that packets in the Hi buffer are sent earlier if there always are packets in the Hi buffer but that packets in the Lo buffer are sent earlier if there are no packets in the Hi buffer and if there are any packets in the Lo buffer.

Consequently, the quality ensured traffic flow (A) to be transmitted through Local Bus 1 or 2 via the Hi buffer is always given a top priority and its quality is always ensured.

Next, the best-effort low-delay type traffic flow (B) is transmitted through Local Bus 1 with the lower rate via the Lo buffer in order to give a higher priority to the quality ensured type traffic flow (A).

On the other hand, on the backbone bus, the buffers to store the packets are changed into the Hi buffer in order to give a higher priority to the best-effort low-delay type traffic flow (B) than to the best effort type traffic flow (C).

The best effort type traffic flow (C) needs to satisfy no quality requirement, and therefore, is transmitted via the Lo buffer through both Local Bus 2 and the backbone bus.

The processing of changing the type of buffer to store packets according to the type of the quality requirement is performed by the router R1 as for the traffic flow running from Local Bus 1 to the backbone bus, and by the router R3 as for the traffic flow running from Local Bus 2 to the backbone bus.

Look at a traffic flow running from the local buses to the backbone bus, and it can be seen that three types of buffers at the local bus end are changed according to this embodiment into two types of buffers at the backbone bus end.

As for a traffic flow running from the backbone bus to Local Buses 1 and 2, on the other hand, the number of the different types of buffers is changed by the gateway GW. Specifically, the buffers to store a traffic flow running from the backbone bus to those local buses are changed from two types of buffers at the backbone bus end into three types of buffers (provided for the quality ensured, best-effort low-delay, and best effort types, respectively) on the entire local buses (including Local Buses 1 and 2).

As can be seen, the types of buffers to store a traffic flow at the destination change according to the running direction of the traffic flow between the local buses and the backbone bus.

Figure 6:
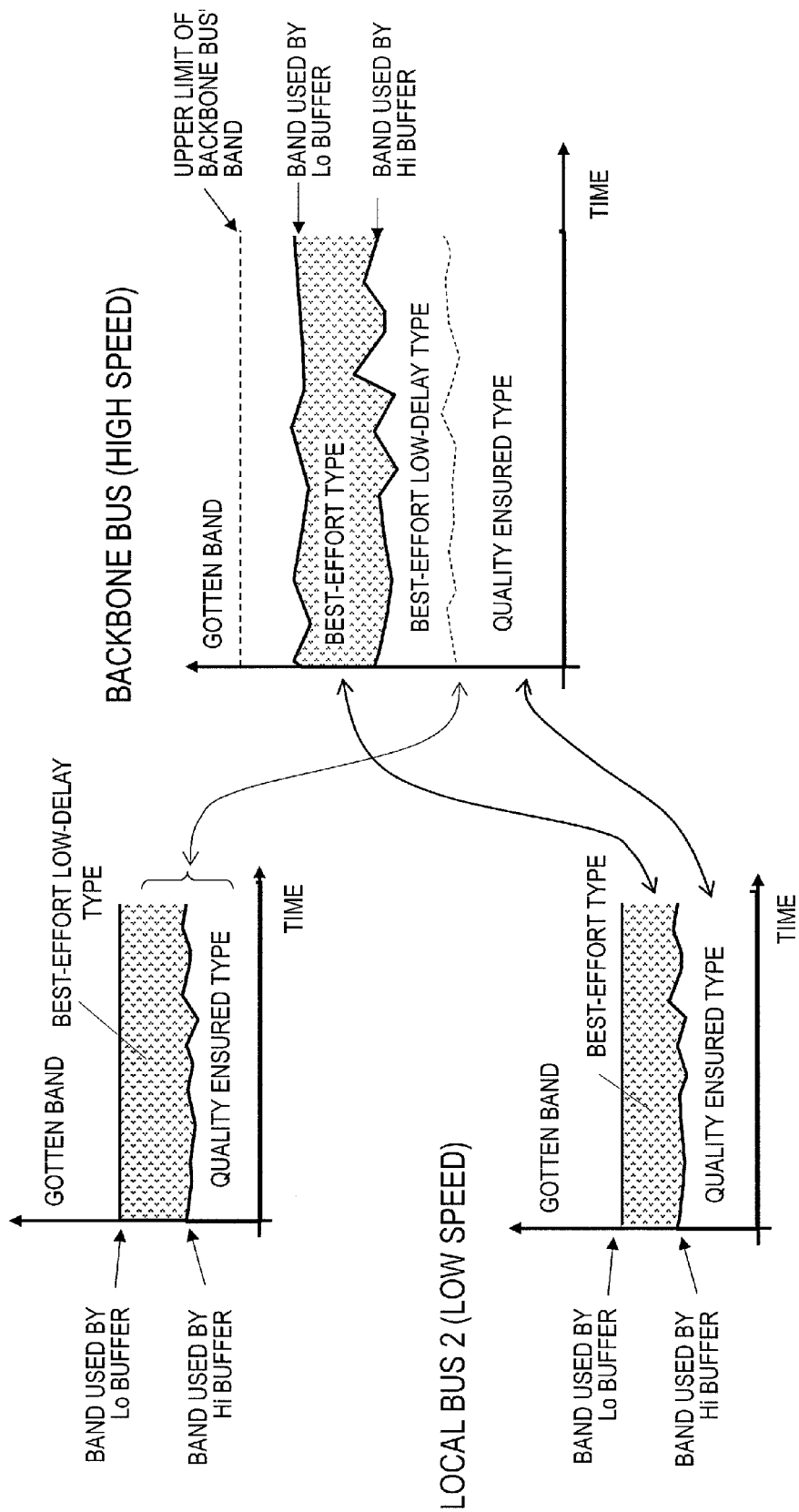
FIG. 6 shows the transmission bands gotten by multiple traffic flows with mutually different types of quality requirements on the local buses and on the backbone bus.

FIG. 6 shows the transmission bands gotten by multiple traffic flows with mutually different types of quality requirements on the local buses and on the backbone bus.

On Local Buses 1 and 2 to which a relatively narrow transmission band is allocated, the quality ensured type traffic flow (A) to be transmitted via the Hi buffer gets its necessary transmission band.

On the other hand, by transmitting the best-effort low-delay type traffic flow (B) and the best effort type traffic flow (C), of which the traffic flow rates can be adjusted, via the Lo buffers, the traffic flows can be transmitted adaptively to the bandwidth available.

On the backbone bus on which the best-effort low-delay type traffic flow (B) and the best effort type traffic flow (C) get confluent with each other, the best-effort low-delay type traffic flow (B), along with the quality ensured type traffic flow (A), is transmitted via the Hi buffer in order to give a higher priority to the best-effort low-delay type traffic flow (B) than to the best effort type traffic flow (C).

It should be noted that the transmission bandwidth of the backbone bus is supposed to be designed in advance to be sufficiently broader than those of the bands gotten by the quality ensured type traffic flow (A) and the best-effort low-delay type traffic flow (B).

As can be seen, by using only two types of buffers in the routers R and the gateway GW and by changing the number of different types of buffers to store packets according to the type of the quality requirement on the given traffic flow and according to the bus bandwidth varying on the transmission path, traffic flows can be transmitted by sensing the difference between the three different types of quality requirements.

It should be noted that the number of different types of traffic flows adopted in the foregoing description is just an example. The present disclosure may be generalized as follows. Each bus master outputs packets including information about at least one of (N+1) predetermined types of quality requirements to local buses, which transmit packets designating at most N types of quality requirements. The bus master may output only packets representing a particular type of quality requirement or may change dynamically the type of quality requirement.

Each router arranged on the local buses includes: an input port which receives the packets including the information about the quality requirements; a buffer section including at most N different types of buffers to classify and store the packets by reference to the information about the types of quality requirements which is included in the packets received; a buffer allocating section which determines, according to the type of the given quality requirement, in which of a destination router's buffers of the at most N different types the packets need to be stored; and a sending control section which controls sending the packets by scheduling sending order of the packets so that the packets that are stored in the buffer section are sent in the descending order of their level of the quality requirement. And the router controls sending schedule of traffic flows by sensing a difference between the (N+1) different types of quality requirements.

Hereinafter, it will be described exactly what configuration each router may have and how the router may operate.

(Embodiment 1)

Figure 7:
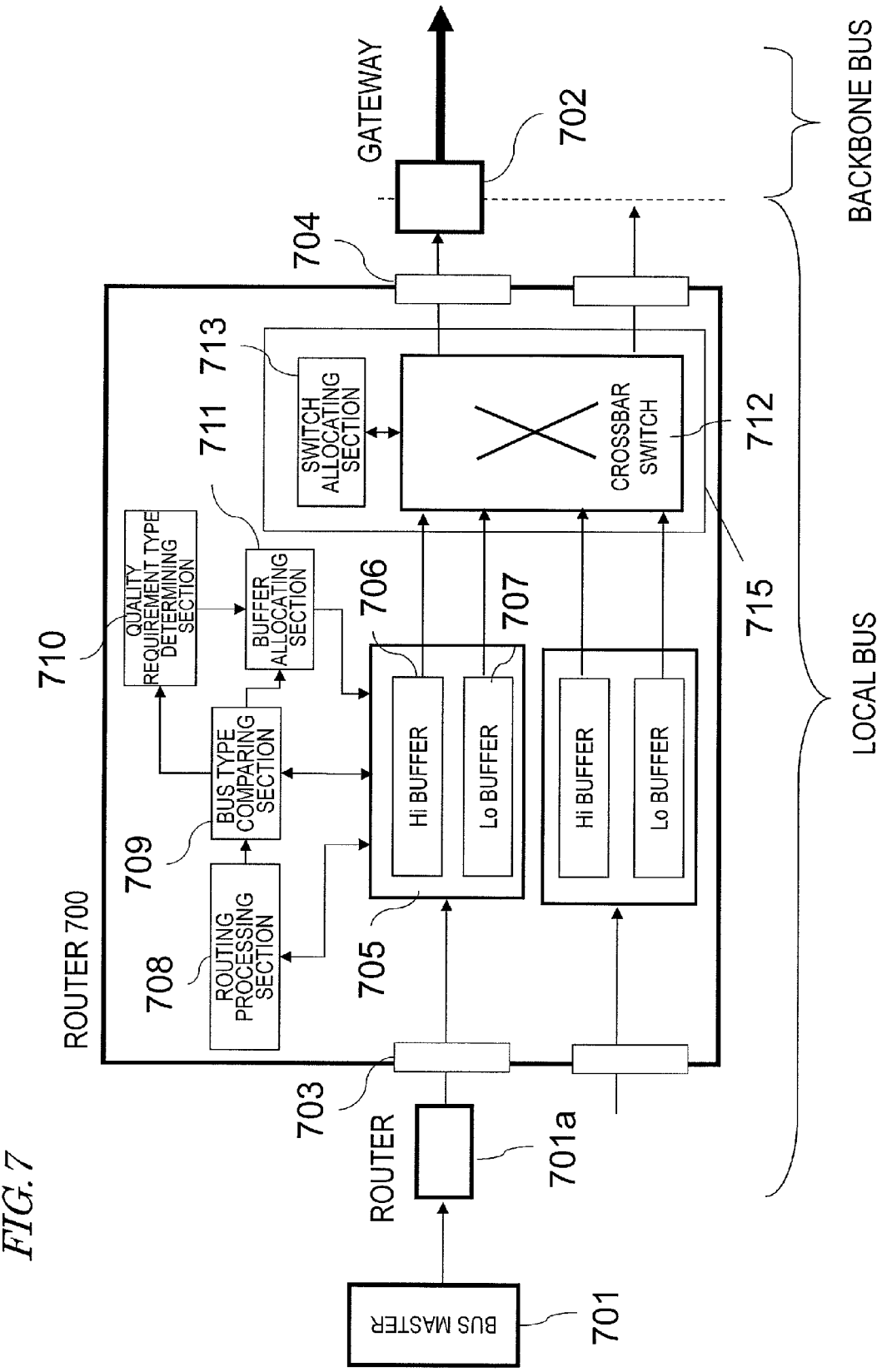
FIG. 7 shows a block diagram illustrating a configuration for a router 700 according to a first embodiment.

FIG. 7 illustrates a configuration for a router 700 according to a first embodiment. In FIG. 7, also illustrated are a bus master 701 which transmits and receives a traffic flow, another router 700a which is adjacent to this router 700, and a gateway 702 which connects a local bus and a backbone bus together.

The router 700 includes input ports 703, output ports 704, a buffer section 705, a routing processing section 708, a bus type comparing section 709, a quality requirement type determining section 710, a buffer allocating section 711, and a sending control section 715.

The input ports 703 receive packets which have been sent from the adjacent router 701a or from the bus master 701.

The output ports 704 output packets from this router 700 to another adjacent router or the gateway 702.

The buffer section 705 stores the packets that have been received at the input ports 703. To classify those packets representing mutually different types of quality requirements before storing them, the buffer section 705 includes at least one Hi buffer 706 and at least one Lo buffer 707 for each of those input ports 703.

The routing processing section 708 chooses one of the output ports 704, through which each of the packets stored in the buffer section 705 is going to be sent, by reference to the address information of the destination that is described in the packet.

The bus type comparing section 709 determines whether or not the type of the bus at the input port (703) end is the same as that of the bus at the output port (704) end that has been chosen by the routing processing section 708. The types of the buses connected to the respective input ports and output ports have already been determined at the time of the design. And the bus type comparing section 709 retains information about the correspondence between the types of the buses to which the respective input ports and output ports are connected.

FIG. 8 shows an exemplary set of information to be managed by the bus type comparing section 709. In FIG. 8, the information indicates that Input Ports 0 and 1 and Output Port 0 are connected to local buses and Output Port 1 is connected to a backbone bus.

It should be noted that the phrase "Output Port 1 is connected to a backbone bus" does not always mean that Output Port 1 is directly connected to the backbone bus. Rather, even if Output Port 1 is connected to a path leading to the gateway 702 that is connected to the backbone bus as shown in FIG. 7, it can also be said "Output Port 1 is connected to the backbone bus".

The quality requirement type determining section 710 has a quality requirement type determining rule 2901 that defines the type of the buffer to be used to store packets in the router 700 (or gateway 702) at the destination with respect to each combination of the type of the bus at the output port end and the type of the quality requirement on the packets. If the decision has been made by the bus type comparing section 709 that the types of the buses at the input port (703) end and at the output port (704) end are different from each other, the quality requirement type determining section 710 performs the following processing. Specifically, by reference to the quality requirement type determining rule 2901, the quality requirement type determining section 710 determines again the type of the buffer (i.e., whether the buffer to use is the Hi buffer 706 or the Lo buffer 707) to be used in the router 700 at the destination (or in the gateway 702) to store packets that are going to be sent with respect to the combination of the type of the quality requirement on the packets to be sent and the type of the bus beyond the output port.

If there is sufficient space left in the type of a buffer (i.e., either an Hi buffer or a Lo buffer) that has been designated by the quality requirement type determining section 710 in the gateway 702 (or router) at the destination, the buffer allocating section 711 allocates one of those buffers as a buffer to store the packets that are going to be sent.

The sending control section 715 controls sending the packets that are stored in the buffer section 705 by scheduling sending order of the packets so that the packets are sent in the descending order of their level of quality requirement. The sending control section 715 includes a crossbar switch 712 and a switch allocating section 713.

The crossbar switch 712 is used to switch connection between the buffer section 705 including a plurality of buffers (i.e., Hi buffers 706 and Lo buffers 707) and the output ports.

By turning the crossbar switch 712, the switch allocating section 713 changes connection between the buffer section 705 and the output ports 704, thereby controlling the sending schedule of the packets that are stored in the respective buffers of the buffer section 705.

Figure 9:
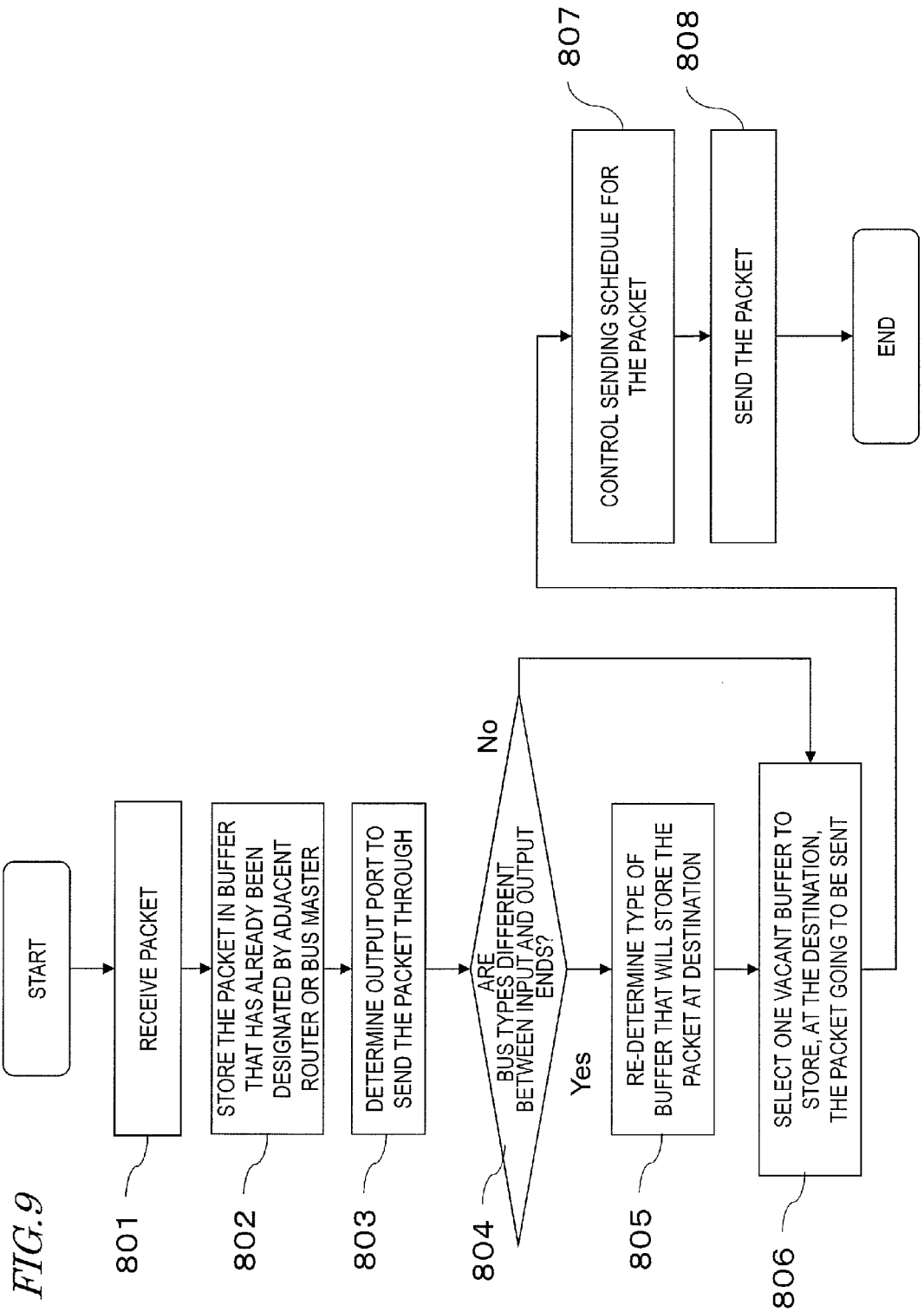
FIG. 9 shows a flowchart showing a series of operations to be performed by the router 700 until the router 700 sends packets received to an adjacent router (or gateway GW).

FIG. 9 is a flowchart showing a series of operations to be performed by the router 700 until the router 700 sends the packets received to an adjacent router (or gateway GW).

First of all, in Step 801, the router 700 receives packets at the input ports 703 from either the adjacent router 701a or the bus master 701.

In this embodiment, packets are transmitted to the router 700 while being divided into flits, which represent a transmissible data size, once every time a bus clock signal completes a single cycle.

Hereinafter, the relation between a packet 900 and flits according to this first embodiment will be described with reference to FIG. 10. In this packet 900, written are control information 901 which needs to be used to deliver the packet itself to its destination, data 902 to be sent, and an end code 903 indicating the end of this packet.

When sent from the bus master 701, the packet 900 is divided into a plurality of flits, which are sequentially transmitted one by one. In a header flit 904 which is the first one of those multiple flits divided, written is the control information 901. In data flits 905 that follow the header flit 904, written is the content 902 of data. And in a tail flit 906 which is the last one of those flits, written is the end code 903.

As the control information 901, the destination address of the packet, its source address, the traffic flow's type of quality requirement and other pieces of information may be written.

In this embodiment, two-bit information is added as a piece of information indicating the type of quality requirement to the header flit 904. Specifically, if the type of quality requirement is the quality ensured type (A), "11" is written. If the type of quality requirement is the best-effort low-delay type (B), "01" is written. And if the type of quality requirement is the best effort type (C), "00" is written.

Figure 10:
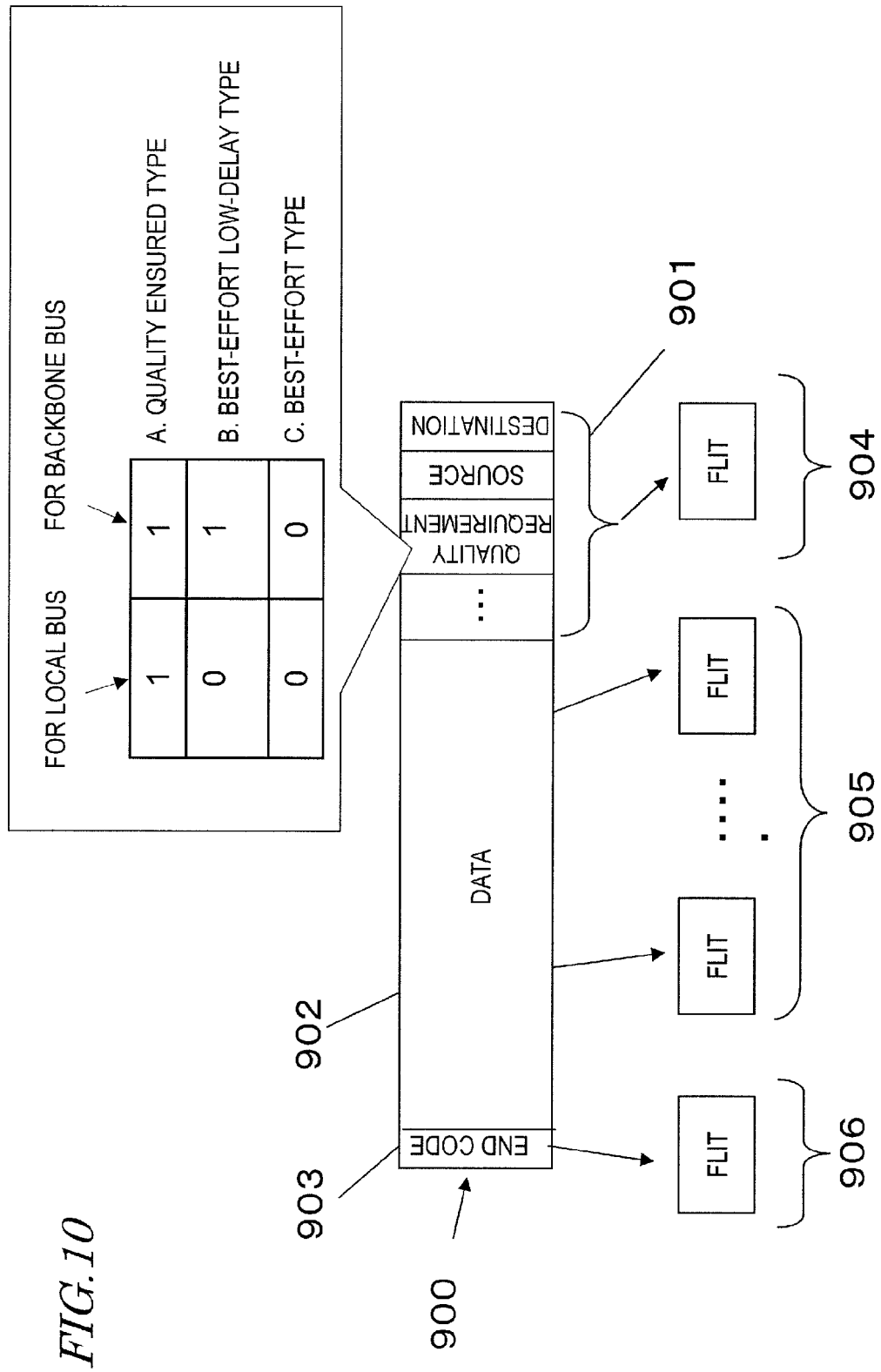
FIG. 10 shows a relation between a packet 900 and flits according to the first embodiment.

In FIG. 10, the respective values of these three types (A), (B) and (C) are shown side by side to allow the reader to understand easily what these pieces of information are used for. It should be noted, however, that any of "11", "01" and "00" is actually written according to the type of the given quality requirement as described above.

Next, in Step 802 (see FIG. 9 again), the input ports 703 store the packets in the buffers that have already been designated by either the source router 701a or the bus master 701.

Once the packets have been stored in any of the buffers in the buffer section 705 of the router 700, the routing processing section 708 refers to the packet destination address which is described in the header flit of the packets that are stored in the buffer section 705, thereby selecting one of the output ports 704 through which the packets are going to be sent.

For example, the routing processing section 708 may select one of the output ports in the following manner. Specifically, a routing table which associates the destination address of a packet with an output port one to one may be defined in advance in the router. And an output port that is associated with the destination address of the packets that are going to be sent may be located by reference to the routing table.

FIGS. 11A and 11B show exemplary routing tables.

In the routing table shown in FIG. 11A, the destination addresses of packets are represented as three bits, and an output port is defined one to one with respect to each of the eight different addresses that are represented as three bits.

In the example shown in FIG. 11A, the routing processing section 708 selects Output Port 0 if the destination address of the packet is 000, 001, 010 or 011 but selects Output Port 1 if the destination address of the packet is 100, 101, 110 or 111.

Instead of using the routing table shown in FIG. 11A, any other method for uniquely determining an output port associated with a given destination address nay also be adopted. For example, a routing table which defines an output port to use by reference to only the most significant bit of the destination address may also be used as shown in FIG. 11B in order to cut down the size of the routing table.

Once the output port 704 to output the packets has been selected, the bus type comparing section 709 of the router 700 determines, in Step 804 (see FIG. 9 again), whether or not the type of the bus at the output port (704) end that has been determined in Step 803 is different from the type of the bus at the input port (703) end. It should be noted that the types of the buses to which the respective input ports and output ports are connected are determined during the design process and the types of the respective input and output ports are defined as shown in FIG.

If their bus types are the same, the process advances to Step 806. On the other hand, if their bus types are different, the process advances to Step 805.

In Step 805, the quality requirement type determining section 710 determines, according to the type of quality requirement on the packets and the bandwidth of the bus beyond the output port 704, the type of the buffer (i.e., either Hi buffer or Lo buffer) that will store the packets that are going to be sent in a router (or gateway) beyond the output port 704.

FIG. 29 shows an example of the quality requirement type determining rule 2901a retained in the quality requirement type determining section 710. The quality requirement type determining rule 2901a defines the type of the buffer to store the packets at the destination router with respect to each combination of a bus type at the output port end and the type of the quality requirement on the packets (i.e., the type of the quality requirement described in the header flit).

In FIG. 29, in a situation where the bus type at the output port end is "backbone bus", if the left one of two bits that are described in the header flit of a packet to indicate the type of its quality requirement is "1", a Hi buffer is defined as a buffer to store that packet at the destination router. On the other hand, if the left bit of a packet is "0", a Lo buffer is defined as a buffer to store that packet at the destination router.

Meanwhile, in a situation where the bus type at the output port end is "local bus", if the right one of two bits that are described in the header flit of a packet to indicate the type of its quality requirement is "1", a Hi buffer is defined as a buffer to store that packet at the destination router. On the other hand, if the right bit of a packet is "0", a Lo buffer is defined as a buffer to store that packet at the destination router.

In this embodiment, if the bus beyond the output port is a local bus, the quality requirement type determining section 710 refers to the left bit value of the quality requirement that is described in the header flit shown in FIG. 10, and determines the type of the storage buffer to be a Hi buffer when finding the value to be "1" but to be a Lo buffer when finding the value to be "0".

On the other hand, if the bus beyond the output port is a backbone bus, the quality requirement type determining section 710 refers to the right bit value of the quality requirement that is described in the header flit shown in FIG. 10, and determines the type of the storage buffer to be a Hi buffer when finding the value to be "1" but to be a Lo buffer when finding the value to be "0".

That is why if there is a local bus beyond the output port 704, the buffer to store a traffic flow of the quality ensured type (A) is determined to be a Hi buffer, while the buffer to store a traffic flow of the best-effort low-delay type (B) or a traffic flow of the best effort type (C) is determined to be a Lo buffer. On the other hand, if there is a backbone bus beyond the output port 704, the buffer to store a traffic flow of the quality ensured type (A) or a traffic flow of the best-effort low-delay type (B) is determined to be a Hi buffer, while the buffer to store a traffic flow of the best effort type (C) is determined to be a Lo buffer.

Once the type of the buffer to store the packet that is going to be sent at a router (or gateway) beyond the output port has been determined, the buffer allocating section 711 selects in Step 806 one vacant buffer to store the packet that is going to be sent at that router (or gateway) beyond the output port. If there are no vacant buffers available, then the buffer allocating section 711 carries out this processing step 806 over and over again until there is a buffer available at the router beyond the output port.

It should be noted that the quality requirement type determining rule shown in FIG. 29 is only an example. And any other definition may also be used. For example, the rule may also define the type of the buffer to store a packet at a destination router with respect to a combination of the type of a bus at the output port end (which may be Local Bus 1, Local Bus 2 or backbone Bus) and the type of the quality requirement on the packet (which may be quality ensured type, best-effort low-delay type or best effort type).

In the example shown in FIG. 10, the types of quality requirements are supposed to be defined and described in advance in the header flit with respect to the local buses and the backbone bus. However, every time a packet is sent to a bus of a different type, the router may change dynamically the quality requirement type value that is described in the header flit. For example, look at the bus master BM1 shown in FIG. 5. The quality requirement type of the bus master EM1 is best-effort low-delay type. That is why if a packet is going to be sent through Local Bus 1, the quality requirement type value in the header flit may be changed into "0" to use a Lo buffer. On the other hand, if a packet is going to be sent through the backbone bus, the quality requirement type value in the header flit may be changed into "1" to use a Hi buffer.

Once the type of the storage buffer beyond the output port is determined in this manner, the switch allocating section 713 determines in Step 807 which of the multiple buffers in the buffer section 705 should be connected to the output port 704, thereby controlling the sending schedule of the packet.

Figure 12:
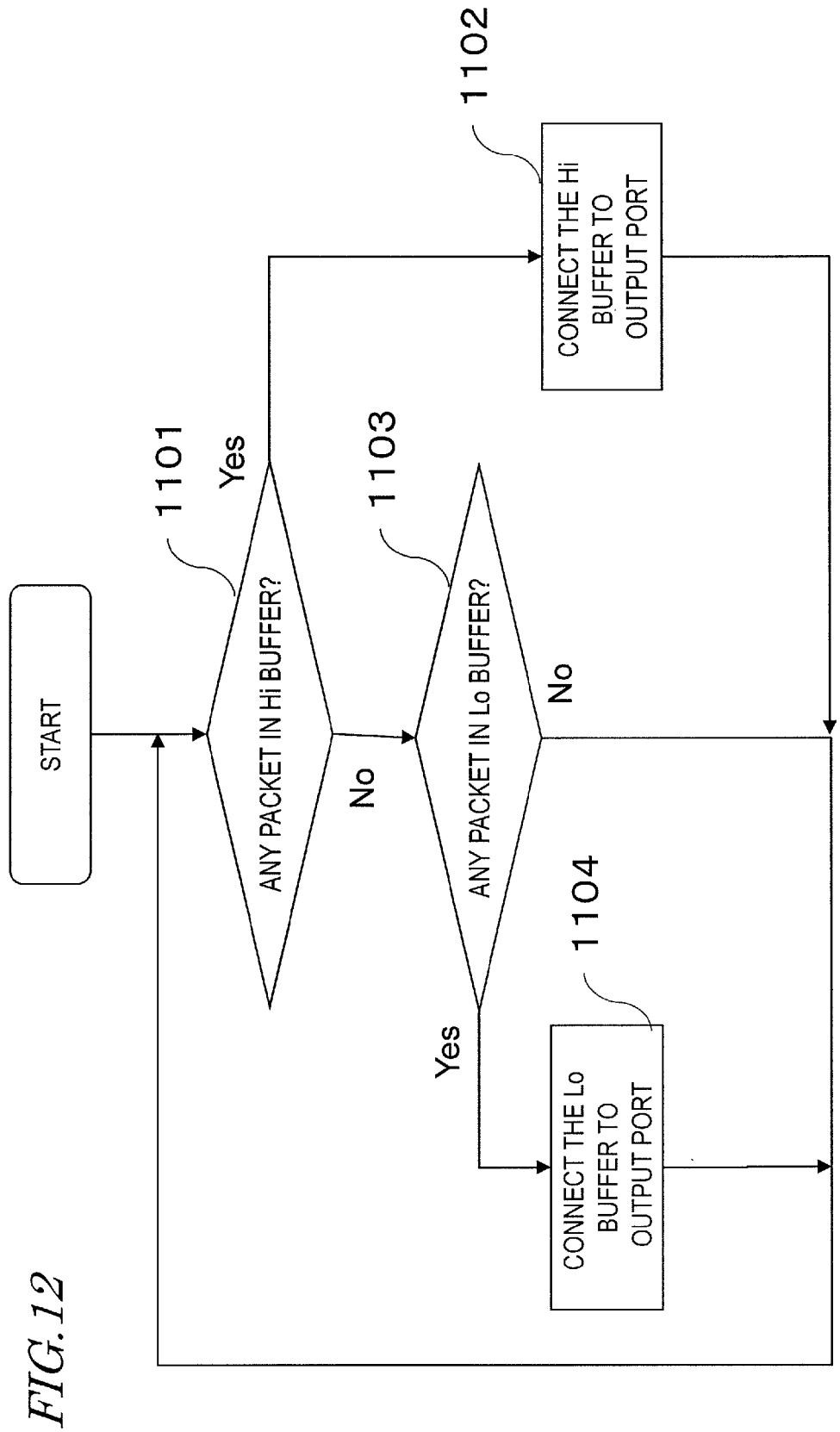
FIG. 12 shows a flowchart showing how a switch allocating section 713 determines which of multiple buffers should be connected to the output port 704.

FIG. 12 is a flowchart showing how the switch allocating section 713 determines which of those multiple buffers should be connected to the output port 704.

First of all, in Step 1101, a decision is made whether or not there is any packet, of which the type of the storage buffer beyond the output port has already been determined, in the Hi buffer. If the answer is YES, the process advances to Step 1102 to connect the Hi buffer to the output port.

If there are multiple Hi buffers, of which associated storage buffer beyond the output port has already been determined, in the same router, one of those Hi buffers is selectively connected to the output port. To select one of those multiple Hi buffers, the sending time of each packet may be described as control information in the packet, and Hi buffers may be sequentially connected to the output port in the ascending order of the packet sending time (i.e., a Hi buffer that stores a packet with the earliest sending time is given a top priority). In this manner, packets can be sent to their destinations without changing their order of sending.

Alternatively, instead of the sending time, the deadline by which a packet should arrive at its destination may also be described as control information, and Hi buffers may be sequentially connected to the output port in the ascending order of the time left before the deadline (i.e., a Hi buffer that stores a packet with the shortest time left before the deadline is given a top priority). As a result, a decrease in required quality due to a transmission delay can be minimized.

Still alternatively, a method for selecting at random a buffer to be connected to the output port or a method for changing the buffers sequentially (e.g., the Round Robin method) may also be used.

If there are no packets, of which the storage buffer beyond the output port has already been determined, in the Hi buffer, the process advances to Step 1103.

In Step 1103, a decision is made whether or not there is any packet, of which the storage buffer beyond the output port has already been determined, in the Lo buffer. If the answer is YES, the process advances to Step 1104, in which the to buffer is connected to the output port.

If there are multiple Lo buffers, of which associated storage buffer beyond the output port has already been determined, in the same router, one of those Lo buffers is selectively connected to the output port, as in the case of the Hi buffers described above.

However, if there are no packets, of which the storage buffer beyond the output port has already been determined, in the Lo buffer, then the process goes back to the processing step 1101.

In Step 808, the buffer connected to the output port 702 sends the packet to the adjacent router (or gateway).

As can be seen, according to this first embodiment of a router that has such a configuration and that operates as described above, the sending schedule can be controlled adaptively to any of three type traffic flows with mutually different quality requirements without increasing the number of different types of buffers in the router.

In the first embodiment described above, three types of traffic flows with mutually different quality requirements are supposed to be transmitted using a router with two types of buffers. However, the number of different types of quality requirements on the traffic flows and the number of types of buffers do not have to be three and two, respectively.

For example, four types of quality requirements may be defined by further classifying the quality ensured type (A) into two types, namely, a time delay guaranteed type (A1) which guarantees a time delay it takes for a traffic flow to reach its destination, and a throughput guaranteed type (A2) which guarantees that data can be transferred as a traffic flow at a constant rate within a predetermined period of time. In this example, a transmission band is supposed to be allocated preferentially to a traffic flow of the time delay guaranteed type (A1) rather than to a traffic flow of the throughput guaranteed type (A2).

Figure 13:
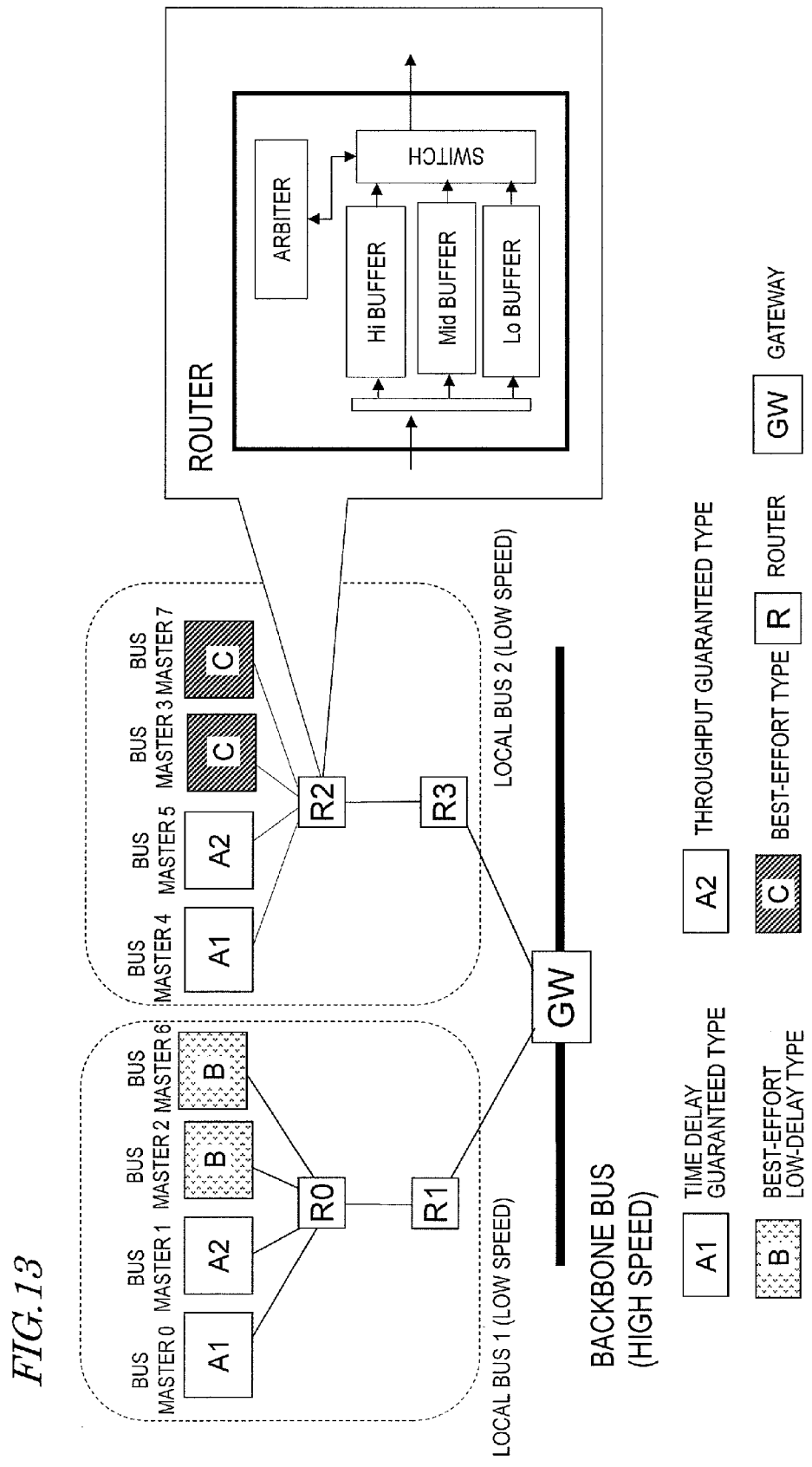
FIG. 13 illustrates an exemplary connection in which three types of quality requirements are imposed on traffic flows passing through the routers R.

In a semiconductor integrated circuit which uses routers according to this embodiment, to impose only three types of quality requirements on traffic flows running through the routers R, (1) bus masters that use the same gateway GW are classified into multiple groups that belong to mutually different local buses as shown in FIG. 13. Also, (2) each of the routers R and the gateway GW uses only three types of buffers, namely, a Hi buffer which stores a packet with the most rigid quality requirement, a Mid buffer which stores a packet with the second most rigid quality requirement, and a Lo buffer which stores a packet with the least rigid quality requirement.

Furthermore, in relaying a traffic flow between a router R on one of the local buses thus classified and a gateway GW connected to the backbone bus, (3) the type of the buffer to store a packet is changed according to the type of the quality requirement.

Local Bus 1 transmits traffic flows of the three types (i.e., the time delay guaranteed type (A1), the throughput guaranteed type (A2) and the best-effort low-delay type (B)). On the other hand, Local Bus 2 transmits traffic flows of the three types (i.e., the time delay guaranteed type (A1), the throughput guaranteed type (A2) and the best effort type (C)).

The sending schedule is controlled for the respective routers R in the following manner. Firstly, if there is any packet in a Hi buffer, the packet in the Hi buffer is sent preferentially. Secondly, a packet is sent from a Mid buffer only when there are no packets in the Hi buffer. Lastly, a packet is sent from a Lo buffer only when there are no packets in any of the Hi and Lo buffers.

FIG. 14 shows a difference in the type of the storage buffer between the local buses and the backbone bus in the configuration shown in FIG. 13.

A traffic flow of the time delay guaranteed type (A1), to which a top priority is given in these four types, is always transmitted via a Hi buffer. On the other hand, a traffic flow of the best effort type (C) with the lowest degree of priority is transmitted via a Lo buffer.

Meanwhile, when transmitted through a local bus at a low transfer rate, a traffic flow of the throughput guaranteed type (A2) uses a Mid buffer so as to avoid affecting the traffic flow of the time delay guaranteed type (A1). But when transmitted through the backbone bus at a high transfer rate, a traffic flow of the throughput guaranteed type (A2) uses a Hi buffer so as to be given a higher priority than the best-effort low-delay type (B) or the best effort type (C).

And when transmitted through a local bus at a low transfer rate, a traffic flow of the best-effort low-delay type (B) uses a Lo buffer so as to avoid interfering with a traffic flow of the time delay guaranteed type (A1) or a traffic flow of the throughput guaranteed type (A2). But when transmitted through the backbone bus at a high transfer rate, a traffic flow of the best-effort low-delay type (B) uses a Mid buffer so as to be given a higher priority than the best effort type (C).

Figure 15:
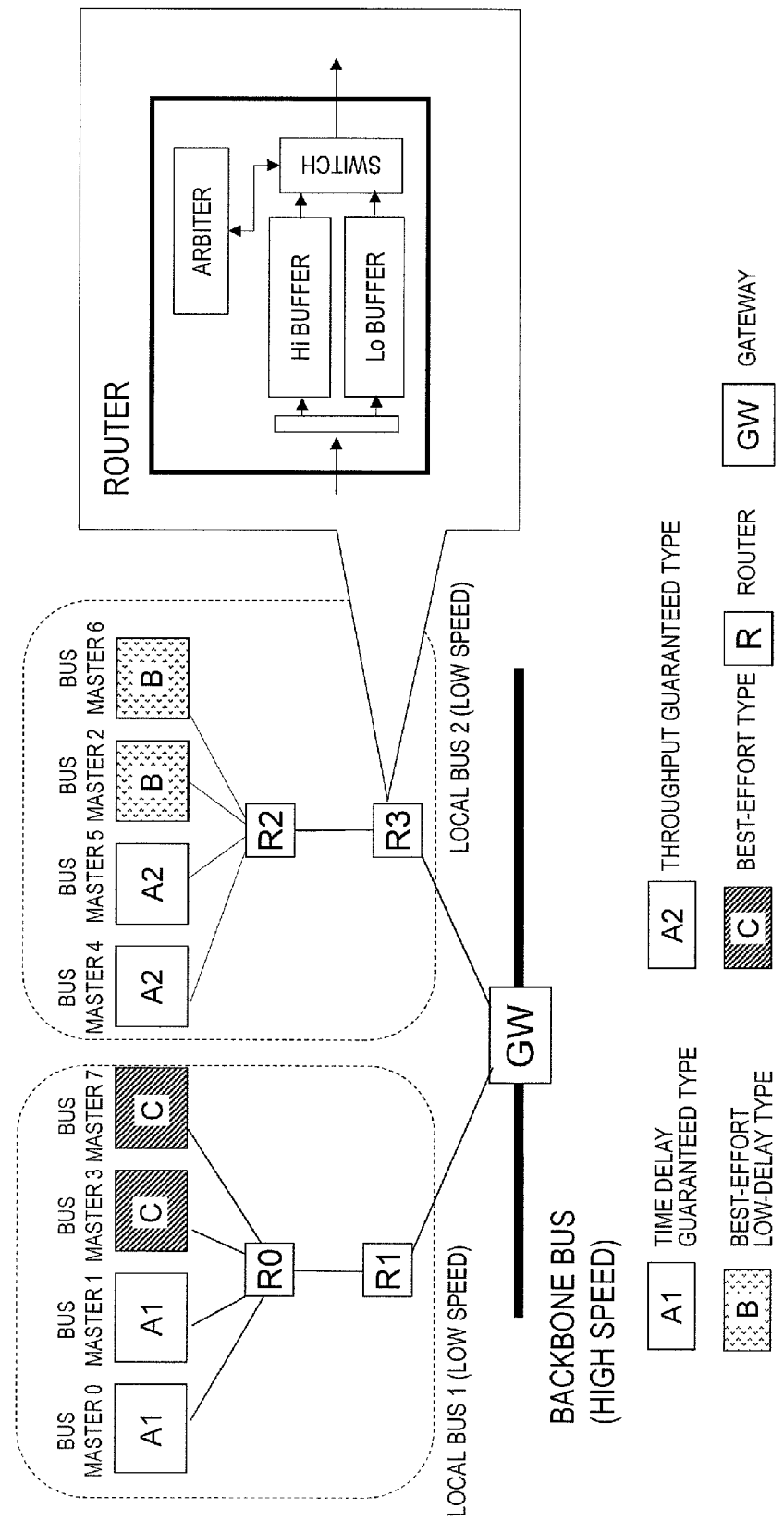
FIG. 15 illustrates an exemplary connection in which two types of quality requirements are imposed on traffic flows passing through the routers R.

Also, if the number of different types of quality requirements on a traffic flow to be transmitted through each local bus is cut down to two by making Local Bus 1 accommodate a traffic flow of the time delay guaranteed type (A1) and a traffic flow of the best effort type (C) and by making Local Bus 2 accommodate a traffic flow of the throughput guaranteed type (A2) and a traffic flow of the best-effort low-delay type (B) as shown in FIG. 15, then the number of different types of buffers in each router can also be cut down to two.

FIG. 16 shows a difference in the type of the storage buffer to use between the local buses and the backbone bus in the configuration shown in FIG. 15.

On Local Bus 1, a traffic flow of the time delay guaranteed type (A1), to which a top priority is given, is transmitted via a Hi buffer. On the other hand, a traffic flow of the best effort type (C) is transmitted via a Lo buffer.

Meanwhile, on Local Bus 2, a traffic flow of the throughput guaranteed type (A2) of a relatively high degree of priority is transmitted via a Hi buffer. On the other hand, a traffic flow of the best-effort low-delay type (B) of a low degree of priority is transmitted via a Lo buffer. Furthermore, on the backbone bus with a broad transmission bandwidth, in order to give a higher priority to a traffic flow of the best-effort low-delay type (B) than a traffic flow of the best effort type (C), a traffic flow of the best-effort low-delay type (B) is transmitted via a Hi buffer and a traffic flow of the best effort type (C) is transmitted via a Lo buffer.

As can be seen, irrespective of the number of different types of quality requirements on a traffic flow, the sending schedule can be controlled by sensing the difference in the type of quality requirement and by using a smaller number of types of buffers than that of the different types of quality requirements.

In the first embodiment described above, every router R and the gateway GW are supposed to have the same types of buffers. However, some routers R or gateway may have different types of buffers from the others.

FIG. 30 illustrates a modified example of the configuration shown in FIG. 5. In the configuration shown in FIG. 30, the routers R1 and R3 shown in FIG. 5 are aggregated into a single router R4.

The router R4 is used on both of Local Buses 1 and 2. And to sense a difference between three types of traffic flows, the router R4 includes three types of buffers, i.e., not only a Hi buffer and a Lo buffer but also a Mid buffer as well.

The order of priorities is defined so as to decrease in the order of the Hi buffer, the Mid buffer and the Lo buffer. A traffic flow of the quality ensured type is transmitted via the Hi buffer. A traffic flow of the best-effort low-delay type is transmitted via the Mid buffer. And a traffic flow of the best effort type is transmitted via the Lo buffer.

By getting a quality requirement type determining rule 3101 defined by the quality requirement type determining section 710 on an individual basis, the type of the buffer to store a packet to be sent can be changed at the router R4, the routers R0 and R2 connected to the router R4, and the gateway GW.

FIG. 31 shows an example of the quality requirement type determining rule 3101 for the gateway GW shown in FIG. 30.

In FIG. 31, if the bus type at the output port end is "backbone bus", a Hi buffer is defined as a buffer to store a packet at the destination router (or gateway) for a traffic flow of the quality ensured type and a traffic flow of the best-effort low-delay type, while a Lo buffer is defined as a storage buffer for a traffic flow of the best effort type.

On the other hand, if the bus type at the output port end is "local bus", a Hi buffer is defined as a buffer to store a packet at the destination router R4 for a traffic flow of the quality ensured type, a Mid buffer is defined as a storage buffer for a traffic flow of the best-effort low-delay type, and a Lo buffer is defined as a storage buffer for a traffic flow of the best effort type.

The quality requirement type determining rule may also be defined in the same way on an individual basis with respect to the routers R0, R2 and R4 shown in FIG. 30.

As can be seen, if two routers, each including two types of buffers, are replaced with a single router including three types of buffers, the number of buffers that the single router has certainly increases but the total number of routers to use decreases. That is why the effect of reducing the overall area of the integrated circuit can be achieved.

(Embodiment 2)

In the first embodiment described above, on the supposition that the type of the quality requirement on each bus master does not change, it has been described how to control the sending schedule by sensing the difference in the type of the quality requirement.

On the other hand, a second embodiment to be described below is a router which controls the sending schedule adaptively to a difference in the type of quality requirement with respect to a traffic flow in which a different type of quality requirement is imposed on a bus master when the application or service changes.

FIG. 17 outlines this second embodiment.

In FIG. 17, the types of quality requirements imposed on Bus Masters 0, 1, 3 and 4 are fixed, but the type of quality requirement imposed on Bus Master 2 changes into either the best-effort low-delay type (B) or the best effort type (C) according to the application.

Local Bus 1 transmits two types of traffic flows, namely, a traffic flow of the quality ensured type (A) and a traffic flow of the best-effort low-delay type (B), and is connected to Bus Masters 0 and 1. On the other hand, Local Bus 2 transmits two types of traffic flows, namely, a traffic flow of the quality ensured type (A) and a traffic flow of the best effort type (C), and is connected to Bus Masters 3 and 4.

Meanwhile, Bus Master 2 has paths leading to both of Local Buses 1 and 2 by way of the router R4.

FIG. 17(A) shows the transmission paths which can be taken for Bus Master 2 to send a traffic flow of the best-effort low-delay type (B). On the other hand, FIG. 17(B) shows the transmission paths which can be taken for Bus Master 2 to send a traffic flow of the best effort type (C) through Local Bus 1.

In FIG. 17(A), if the type of the quality requirement imposed on Bus Master 2 changed into the best effort type (C) and if a traffic flow of the best effort type (C) were transmitted as it is, then the traffic flow would interfere with traffic flows coming from other bus masters and the quality requirement could not be satisfied appropriately, because no buffers are provided on Local Bus 1 for such a traffic flow of the best effort type (C).

That is why if the type of the quality requirement imposed on the traffic flow that has been sent out from Bus Master 2 is changed into the best effort type (C), then the router 4 may change the transmission paths into the one passing through Local Bus 2 as shown in FIG. 17(B). Then, the traffic flow can be transmitted with the quality requirement satisfied without fail.

FIG. 18 illustrates a configuration for a router 800 and a gateway 702 according to this second embodiment.

In FIG. 18, any component also included in the first embodiment shown in FIG. 7 and having substantially the same function as its counterpart is identified by the same reference numeral and its description will be omitted herein.

The router 800 of this embodiment further includes a quality requirement type determining section 1501, a routing table changing section 1502 and a sleep mode management section 1503.

The quality requirement type determining section 1501 determines the type of the quality requirement imposed on a packet that is now stored in the buffer section 705 and that is going to be sent.

The routing table changing section 1502 changes a routing table which defines a correlation between the destination of each packet and its output port according to the type of the quality requirement on the packet that has been determined by the quality requirement type determining section 1501.

The sleep mode management section 1503 manages the ON and OFF states of the power supply for at least one of this router 700 and adjacent routers 700a. In the following description, the sleep mode management section 1503 is supposed to manage both of the power supply of the router 700 and the power supply of the adjacent routers 700a.

FIG. 19 is a flowchart showing a procedure in which the router 800 (or gateway 702) of this second embodiment operates.

In FIG. 19, the same processing step as any of the ones of the first embodiment shown in FIG. 9 is identified by the same reference numeral and its description will be omitted herein.

In Step 1601, the quality requirement type determining section 1501 refers to the type of the quality requirement that is described in the header flit of a packet which is stored in the buffer section 705.

Next, in Step 1602, the decision is made whether or not the routing table currently used is appropriate for the type of the quality requirement that has been referred to. If the answer is YES, the process advances to Step 803. Otherwise, the process advances to Step 1603, in which the routing table changing section 1502 changes the contents of the routing table into the ones associated with the type of the quality requirement on the packet.

FIG. 20 shows routing tables for use in the router R4 of the second embodiment shown in FIG. 17. Specifically, in FIG. 20, the table on the left hand side is a routing table for use to process a traffic flow of the best-effort low-delay type, while the table on the right hand side is a routing table for use to process a traffic flow of the best effort type.

In the router R4 of this second embodiment, a different routing table is provided for each quality requirement type, and if the type of a quality requirement imposed on the given traffic flow is the best-effort low-delay type, a routing table which always specifies Output Port 0 is used. On the other hand, if the type of a quality requirement imposed on the given traffic flow is the best effort type, a routing table which always specifies Output Port 1 is used.

If the type of the quality requirement is changed, then the transmission paths need to be changed for not only a traffic flow being transmitted from a bus master to the backbone bus but also a traffic flow returning from the backbone bus to a bus master as well.

FIGS. 21A and 21B show a method for shortening the processing time it will take to change the transmission paths of a traffic flow returning from the backbone bus to a bus master in a situation where the transmission paths of a traffic flow running from the bus master to the backbone bus have been changed responsive to the change of the type of quality requirement.

In FIG. 21A, at a point in time when a traffic flow returning from the backbone bus to a bus master arrives at a gateway, the routing table in the gateway is changed and an appropriate transmission path is selected. In that case, since no traffic flow can be sent to any local bus while the routing table is changed, a delay is caused.

In FIG. 21B, on the other hand, when a traffic flow sent from a bus master to the backbone bus passes through the gateway, the routing table of the gateway is changed to plan a returning transmission path in advance. By doing this, as soon as the returning traffic flow arrives at the gateway, the traffic flow can be redirected to the best transmission path to satisfy the quality requirement. As a result, the transmission delay of the returning traffic flow can be cut down.

FIG. 22 is a flowchart showing the procedure of operation of the router 700 including the processing step of changing the returning transmission paths from the backbone bus to the bus master.

In FIG. 22, the same processing step as any of the ones shown in FIG. 19 is identified by the same reference numeral and its description will be omitted herein.

In Step 1604, the quality requirement type determining section 1501 determines whether or not the routing table currently used is appropriate for the returning transmission path to satisfy the type of quality requirement imposed on the traffic flow. If the answer is YES, the process advances to Step 803. Otherwise, the process advances to Step 1605.

In Step 1605, the routing table changing section 1502 changes the contents of the routing table according to the type of the quality requirement on the traffic flow with respect to the returning transmission path.

Optionally, when the transmission paths leading from a bus master to the backbone bus are changed, the decision may be made in advance, on a traffic flow basis, whether or not the returning transmission paths will have to be changed, too.

For example, as a for a traffic flow, of which the returning transmission paths need to be changed in advance, a flag may be included in the control information for a packet to indicate whether or not to change the returning paths in advance. And the contents of the routing table for the returning path are changed in advance only when the flag is ON.

FIGS. 23A and 23B shows how to make a power management when the transmission paths are changed responsive to a change of the type of quality requirement. In FIG. FIGS. 23A and 23B, the bus master and the gateway are connected together via three routers which are arranged on upper and lower transmission paths.

FIG. 23A illustrates a situation where the traffic flow uses only the upper transmission path. In this case, by cutting off the power to the router on the lower transmission path, through which no traffic flows are running, the overall power dissipation of this integrated circuit can be cut down.

On the other hand, FIG. 23B illustrates a situation where the transmission paths have been changed responsive to a change of the type of quality requirement on the traffic flow. In this case, in order to transmit a traffic flow through the lower transmission path, the power to the router on the lower transmission path needs to be turned ON. Meanwhile, by cutting off the power to the router on the upper transmission path through which no traffic flows are running any longer, the overall power dissipation can be cut down.

Even though the power to the unnecessary router is supposed to be cut off in this example, the router may enter a sleep mode. Even so, the power dissipation can also be cut down.

FIG. 24 is a flowchart showing how the router 800 makes a power management.

In FIG. 24, the same processing step as any of the ones shown in FIGS. 9 and 19 is identified by the same reference numeral and its description will be omitted herein.

When the routing processing section 708 determines in Step 803 the output port through which a packet is going to be sent, the router makes the power management section 1503 manage the sleep mode of the router beyond the output port in Step 2101.

FIG. 25 is a flowchart showing how the sleep mode management section 1503 operates.

First, in Step 2201, the decision is made whether or not the transmission paths have been changed.

If the answer is YES, the process advances to Step 2202. Otherwise, the process ends.

In Step 2202, the sleep mode management section 1503 notifies the router that had been sending a traffic flow until the transmission paths were changed that the traffic flow has already been sent.

If there are no other traffic flows to relay, the router turns off the power in response to the notification.

Next, in Step 2203, the sleep mode management section 1503 determines whether the power to the router on the newly selected transmission path is ON or OFF. If the power has turned out to be OFF, the process advances to Step 2204. On the other hand, if the power has turned out to be ON, the process ends.

In Step 2204, the sleep mode management section 1503 instructs the router beyond the output port to turn the power ON. In accordance with the instruction, the router turns the power ON.

As can be seen, if the transmission paths of a traffic flow have been changed responsive to a change of the type of quality requirement on the traffic flow, the ON and OFF states of the power to the router on the transmission path that needs to be used to transmit the traffic flow may be controlled finely. Then, the overall power dissipation of the integrated circuit can be cut down.

In the example described above, the sleep mode management section 1503 is supposed to manage the power to the entire router. However, only some of the functions (such as the routing processing section 708 and the buffer allocating section 711) of the router may be suspended with the power to the router kept ON.

In that case, the power dissipation cannot be reduced as effectively as in a situation where the power to the entire router is directly cut off. However, when the router in the sleep mode needs to be activated again, the functions of the router can be recovered more quickly than in a situation where the power has been cut off completely. That is why a change of the type of quality requirement on a bus master responsive to a change of an application or service can be coped with in a shorter time delay. Optionally, not only some functions but also part of the processing may be omitted as well.

As a modified example of this embodiment, a configuration with no sleep mode management section 1503 may also be adopted.

FIG. 26 illustrates a configuration for a router 801 as a modified example of this embodiment. This router 801 is obtained by omitting the sleep mode management section 1503 from the router 800 shown in FIG. 18. Without the sleep mode management section 1503, power management cannot be made on the router beyond the output port, as well as on the router itself, but the effects to be achieved by the routing table changing section 1502 can also be achieved.

Various embodiments of the present disclosure have been described in the foregoing description.

However, each of those embodiments is just an example and may be modified in various manners and used in numerous applications.

FIG. 27 illustrates an exemplary application of the present disclosure. In the example illustrated in FIG. 27, a plurality of bus masters and memories (including DRAMs and SRAMs) are connected together through distributed buses.

A plurality of bus masters (including peripheral devices, AV processing devices, signal processing devices and processors) on which different types of quality requirements are imposed are classified into a number of groups belonging to multiple local buses according to their function or mutual dependence. Also, each of these local buses is connected to a backbone bus with a broad transmission bandwidth via a gateway.

In the embodiments described above, routers are supposed to be arranged ad hoc. However, any other topology may also be adopted.

FIGS. 28(A) through 28(D) illustrate some examples of those alternative topologies for local buses.

If the routers and gateways of the present disclosure are applied to the buses shown in FIG. 28, there is no need to increase the number of types of buffers to use to that of the types of quality requirements at any router on a local bus or at any gateway on the backbone bus. That is why the quality of each traffic flow running between respective bus masters and memories can be ensured even without increasing the area of the integrated circuit or the power dissipation.

For example, a mesh-type topology may also be formed by arranging multiple routers as a grid as shown in FIG. 28(A). Alternatively, a torus-type topology in which routers are connected both vertically and horizontally to form a ring shape may also be adopted as shown in FIG. 28(B). Still alternatively, a hierarchical topology in which buses are connected together hierarchically may even be adopted as shown in FIG. 28(C). Yet alternatively, a butterfly-type topology in which a constant number of routers are arranged between a plurality of bus masters and a gateway may also be adopted. Anyway, the router of the present disclosure is applicable in the same way to any topology in which a number of bus masters are connected together through distributed buses.

FIG. 32 illustrates an example of a bus system for another semiconductor integrated circuit which can be used according to the present disclosure. In this example, when multiple different SoCs (systems on chips) need to be operated by connecting them together, the SoCs are connected together via routers.

In general, however, if SoCs are developed for mutually different purposes, the definition of a quality requirement on a traffic flow running through the buses will vary from one SoC to another. That is why even if the traffic flow is directly exchanged between those SoCs, the required quality cannot always be ensured.

In the example illustrated in FIG. 32, SoC1 is supposed to include three kinds of bus masters with mutually different types of quality requirements, which may be "high", "middle" and "low" levels, respectively. On the other hand, SoC2 is supposed to include two kinds of bus masters with mutually different types of quality requirements, which may be "with a delay constraint" and "without a delay constraint", respectively. In this description, the "delay constraint" is a constraint that requires that the time delay to be caused to deliver a packet to its destination be shorter than a predetermined amount of time.

The quality requirement is defined differently for SoC1 and SoC2. That is why even if a traffic flow on which a "high level" quality requirement is imposed on SoC1 is sent to SoC2, the traffic flow cannot be transferred through SoC2 with the quality requirement satisfied as intended, because the "high level" quality requirement is not defined for SoC2. In the same way, even when a traffic flow which has been sent from a bus master on which a "middle level" or "low level" quality requirement is imposed is transferred from SoC1 to SoC2, or vice versa, the required quality cannot be ensured, either.

It should be noted that in SoC1, the rigidness of the quality requirement is supposed to decrease in the order of "high level", "middle level" and "low level" in SoC1 and in the order of "with delay constraint" and "without delay constraint" in SoC2.

If the quality requirements are defined differently for multiple chips as in the example described above, then the router that connects SoC1 and SoC2 together in FIG. 32 (such as Routers A and B) transforms the quality requirement imposed on a traffic flow to be sent onto a bus in an SoC with a different type of quality requirement according to the definition of the bus at the destination. For example, Router A transforms a relatively rigid "high level" or "middle level" quality requirement imposed on a traffic flow at SoC1 into as rigid a quality requirement "with delay constraint" in sending the traffic flow to SoC2. On the other hand, Router A transforms a loose "low level" quality requirement imposed on a traffic flow at SoC1 into as loose a quality requirement "without delay constraint" in sending the traffic flow to SoC2. After that, Router A temporarily holds the traffic flows with those quality requirements and then sends them.

As a result, five different types of traffic flows on which mutually different types of quality requirements are imposed and which have been generated by connecting SoC1 and SoC2 together can be transmitted with the required quality ensured just by changing the definition of the priority changing rule at the router without changing the SoCs themselves. Consequently, the cost can be cut down in developing a system in which multiple SoCs are integrated together.

In the foregoing description, each component of the router is illustrated as a block with its own unique function. However, the operation of this router can also get done even by making a processor (computer) built in the router execute a program that defines the processing to be carried out by those functional blocks. The procedure of the processing of such a program is just as shown in the flowcharts of FIG. 9, 12, 19, or 22.

In the embodiments and exemplary applications described above, configurations in which the present disclosure is implemented on a chip have been described. However, the present disclosure can be carried out not just as such on-chip implementation but also as a simulation program for performing design and verification processes before that on-chip implementation process. And such a simulation program is executed by a computer. In this exemplary application, the respective elements shown in FIG. 7 are implemented as a class of objects on the simulation program. By loading a predefined simulation scenario, each class gets the operations of the respective elements performed by the computer. In other words, the operations of the respective elements are carried out either in series or in parallel to/with each other as respective processing steps by the computer.

A class that is implemented as router gets such a simulation scenario which has been defined by a simulator loaded, thereby setting conditions on the threshold value of the degree of priority and so on and also determining the timings to send packets that have been received from a class of other routers, their destinations, degrees of priorities and deadlines.

The class that is implemented as routers performs its operation until the condition to end the simulation, which is described in the simulation scenario, is satisfied, thereby calculating and getting the throughput and latency during the operation, a variation in flow rate on the bus, and estimated operating frequency and power dissipation and providing them to the user of the program. And based on these data provided, the user of the program evaluates the topology and performance and performs design and verification processes.

For example, various sorts of information such as the ID of a source node, the ID of a destination node, the size of a packet to send, and the timing to send the packet are usually described on each row of the simulation scenario. Optionally, by evaluating a plurality of simulation scenarios in a batch, it can be determined efficiently whether or not the intended performance is ensured by every possible scenario imagined. Furthermore, by comparing the performance with the topology or the number of nodes of the bus and/or the arrangement of the source nodes, the routers and the destination nodes changed, it can be determined what network architecture is best suited to the simulation scenario. In that case, the configuration of any of the embodiments described above can be used as design and verification tools for this embodiment. That is to say, the present disclosure can also be carried out as such design and verification tools.

A router according to the present disclosure can control the sending schedule according to the type of the quality requirement on a given traffic flow even without increasing the size of buffers, on which a strict constraint is imposed during implementation, in an integrated circuit with distributed buses.

For that reason, when a DSP for processing multiple media and a CPU for transferring files at high speeds are integrated together on a single SoC (system on chip) with distributed buses, the present disclosure contributes effectively to getting the circuit design process done with a lot of resources saved.

In addition, by saving a lot of resources, the present disclosure can also cut down the power dissipation of the overall integrated circuit.

While the present disclosure has been described with respect to preferred embodiments thereof, it will be apparent to those skilled in the art that the present disclosure may be modified in numerous ways and may assume many embodiments other than those specifically described above. Accordingly, it is intended by the appended claims to cover all modifications of the disclosure that fall within the true spirit and scope of the invention.

What is claimed is:

1. A router to be provided for a bus system in order to relay packets, the bus system comprising: at least one bus master; a first bus; and a second bus which connects the at least one bus master and the first bus together and on which the router is arranged,
    wherein the at least one bus master outputs packets including information about at least one of (N +1) predetermined types of quality requirements, where N is a positive integer,
    the second bus transmits packets designating at most N types of quality requirements,
    the router comprises:
    an input port configured to receive the packets including the information about the quality requirements;
    a buffer section including at most N different types of buffers to classify and store the packets by reference to the information about the types of quality requirements which is included in the packets received;
    a buffer allocating section configured to determine, according to the type of the given quality requirement, in which of a destination router's buffers of the at most N different types the packets need to be stored if a bus type changes at the destination router; and
    a sending control section configured to control sending the packets by scheduling sending order of the packets so that the packets that are stored in the buffer section are sent in the descending order of their level of the quality requirement, and
    the router controls sending schedule of traffic flows by sensing a difference between the (N +1) different types of quality requirements.

2. The router of claim 1, wherein the number of the (N +1) different types of quality requirements is three,
    on the second bus, the traffic flows to be stored in the buffer section has at most two different types of quality requirements, and
    the N types of buffers are first and second buffers to classify two different types of traffic flows on which mutually different types of quality requirements are imposed.

3. The router of claim 2, wherein in the packets, stored are information about the quality requirement imposed on the first bus and information about the quality requirement imposed on the second bus, and
    the buffer section classifies and stores the packets according to the type of the bus to which the input port that has received the packets is connected, the type of the bus at the destination of the packets, and the type of the buffer defined according to the type of the quality requirement.

4. The router of claim 3, wherein the quality requirement imposed on the first bus is different from the quality requirement imposed on the second bus.

5. The router of claim 1, wherein transmission paths to be used by the bus master are changed according to the type of quality requirement indicated by the information about the quality requirement that is stored in the packets.

6. The router of claim 5, further comprising:
    a quality requirement type determining section configured to determine the type of quality requirement in the packets by reference to the information about the quality requirement that is stored in the packets; and
    a routing table changing section configured to change the contents of a routing table that defines the transmission paths of the packets according to the type of the quality requirement that has been determined.

7. The router of claim 6, wherein the quality requirement type determining section determines whether or not the type of the quality requirement in the packets has been changed, and
    the routing table changing section defines a transmission path for a traffic flow that returns from the first bus to the second bus with respect to packets being sent.

8. The router of claim 5, further comprising a power management section configured to control the sleep mode of an adjacent router,
    wherein the power management section controls the ON and OFF states of functions of the adjacent router when the transmission paths are changed in response to a change of the type of quality requirement.

9. The router of claim 5, further comprising a power management section configured to control the sleep mode of the router itself,
    wherein the power management section controls the ON and OFF states of at least some functions of the router itself when the transmission paths are changed in response to a change of the type of quality requirement.

10. A method for controlling a router to be provided for a bus system in order to relay packets, the bus system comprising: at least one bus master; a first bus; and a second bus which connects the at least one bus master and the first bus together and on which the router is arranged,
    wherein the at least one bus master outputs packets including information about at least one of (N +1) types of quality requirements which have been prioritized in advance, where N is a positive integer,
    the second bus transmits packets designating at most N types of quality requirements,
    the router comprises: an input port which receives the packets including the information about the quality requirements; and a buffer section including N different types of buffers to classify and store the packets by reference to the information about the types of quality requirements, and
    the method comprises the steps of:
    determining, according to the type of the given quality requirement, in which of a destination router's buffers of the at most N different types the packets need to be stored if a bus type changes at the destination router;
    allocating the packets to transmission paths so that the packets that are stored in the buffer section are sent in the descending order of their level of the quality requirement; and
    outputting the packets to which the transmission paths have been allocated as a result of the step of allocating,
    whereby the sending schedule of traffic flows is controlled by sensing a difference between the (N +1) different types of quality requirements.

11. A non-transitory computer readable medium containing a computer program stored thereon, wherein the computer program is used to carry out a simulation on a router to be provided for a bus system in order to relay packets, the bus system comprising: at least one bus master; a first bus; and a second bus which connects the at least one bus master and the first bus together and on which the router is arranged, wherein the at least one bus master outputs packets including information about at least one of (N +1) types of quality requirements which have been prioritized in advance, where N is a positive integer, the second bus transmits packets designating at most N types of quality requirements, and the computer program causing the computer to execute:

receiving the packets representing the at most N types of quality requirements at the input port of the router;

classifying and storing the packets in at most N different types of buffers of the router by reference to information about the types of quality requirements included in the packets received;

determining, according to the type of the given quality requirement, in which of a destination router's buffers of the at most N different types the packets need to be stored if a bus type changes at the destination router;

allocating the packets to transmission paths so that the packets that are stored in the buffer section are sent in the descending order of their level of the quality requirement; and outputting the packets to which the transmission paths have been allocated as a result of the step of allocating.

12. A router to be provided for a bus system which includes first and second buses in order to relay packets by connecting the first and second buses together, wherein the first bus transmits packets representing at most (N +1) types of quality requirements, where N is a positive integer, the second bus transmits packets designating at most N types of quality requirements, and the router comprises:

an input port configured to receive the packets including information about the at most (N +1) types of quality requirements;

a buffer section including at most N different types of buffers to classify and store the packets by reference to the information about the types of quality requirements which is included in the packets received;

a buffer allocating section configured to determine, according to the type of the given quality requirement, in which of the at most N different types of buffers of a destination router that is arranged on the second bus the packets need to be stored; and a sending control section configured to control sending the packets by scheduling sending order of the packets so that the packets that are stored in the buffer section are sent in the descending order of their level of the quality requirement.

13. A method for controlling a router to be provided for a bus system which includes first and second buses in order to relay packets by connecting the first and second buses together, wherein the first bus transmits packets representing at most (N +1) types of quality requirements, where N is a positive integer, the second bus transmits packets designating at most N types of quality requirements, and the method comprises the steps of:

receiving the packets including information about the at most (N +1) types of quality requirements at the input port of the router;

classifying and storing the packets in at most N different types of buffers by reference to the information about the types of quality requirements which is included in the packets received;

determining, according to the type of the given quality requirement, in which of the at most N different types of buffers of a destination router that is arranged on the second bus the packets need to be stored; and controlling sending the packets by scheduling sending order of the packets so that the packets that are stored in the at most N types of buffers are sent in the descending order of their level of the quality requirement.

14. A non-transitory computer-readable medium containing a computer program stored thereon, wherein the computer program is used to carry out a simulation on a router to be provided for a bus system which includes first and second buses in order to relay packets by connecting the first and second buses together, wherein the first bus transmits packets representing at most (N +1) types of quality requirements, where N is a positive integer, the second bus transmits packets designating at most N types of quality requirements, and the computer program causing the computer to execute:

receiving the packets including information about the at most (N +1) types of quality requirements at the input port of the router;

classifying and storing the packets in at most N different types of buffers of the router by reference to the information about the types of quality requirements which is included in the packets received;

determining, according to the type of the given quality requirement, in which of the at most N different types of buffers of a destination router that is arranged on the second bus the packets need to be stored; and controlling sending the packets by scheduling sending order of the packets so that the packets that are stored in the at most N types of buffers are sent in the descending order of their level of the quality requirement.

* * * * *